United States Patent
Hwang et al.

(10) Patent No.: US 10,229,051 B2
(45) Date of Patent: Mar. 12, 2019

(54) STORAGE DEVICE INCLUDING NONVOLATILE MEMORY DEVICE AND CONTROLLER, OPERATING METHOD OF STORAGE DEVICE, AND METHOD FOR ACCESSING STORAGE DEVICE

(71) Applicant: Samsung Electronics Co., Ltd., Suwon-si, Gyeonggi-do (KR)

(72) Inventors: JooYoung Hwang, Suwon-si (KR); Dong-Min Kim, Hwaseong-si (KR); Younwon Park, Suwon-si (KR); Songho Yoon, Yongsin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 50 days.

(21) Appl. No.: 15/392,353

(22) Filed: Dec. 28, 2016

(65) Prior Publication Data

US 2017/0192902 A1    Jul. 6, 2017

(30) Foreign Application Priority Data

Dec. 30, 2015  (KR) .................. 10-2015-0190035
Jun. 15, 2016  (KR) .................. 10-2016-0074700
Nov. 29, 2016  (KR) .................. 10-2016-0160792

(51) Int. Cl.
*G06F 12/1027*   (2016.01)
*G06F 12/02*     (2006.01)

(52) U.S. Cl.
CPC ...... *G06F 12/0246* (2013.01); *G06F 12/1027* (2013.01); *G06F 2212/7201* (2013.01); *G06F 2212/7202* (2013.01)

(58) Field of Classification Search
None
See application file for complete search history.

(56) References Cited

U.S. PATENT DOCUMENTS

| | | |
|---|---|---|
| 7,679,133 B2 | 3/2010 | Son et al. |
| 8,112,574 B2 | 2/2012 | Lee et al. |
| 8,219,776 B2 | 7/2012 | Forhan et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,745,309 B2 | 6/2014 | Jung et al. |
| 8,756,375 B2 | 6/2014 | Flynn |
| 8,838,936 B1 | 9/2014 | Salessi et al. |

(Continued)

*Primary Examiner* — Brian R Peugh
(74) *Attorney, Agent, or Firm* — Harness, Dickey & Pierce, P.L.C.

(57) ABSTRACT

An operating method of a storage device that includes a nonvolatile memory device and a controller configured to control the nonvolatile memory device includes sending map data from the storage device to a host device, the map data mapping one or more of a plurality of physical addresses of the nonvolatile memory device to one or more of a plurality of logical addresses of the host device; receiving, at the storage device, a read request from the host device; if the read request includes a physical address, reading data from the nonvolatile memory device based on the included physical address; and if the read request does not include a physical address, translating a logical address of the read request into a first physical address, and reading data from the nonvolatile memory device based on the translated first physical address.

19 Claims, 28 Drawing Sheets

(56) References Cited

U.S. PATENT DOCUMENTS

| | | | |
|---|---|---|---|
| 9,047,177 B2* | 6/2015 | Matsudaira | G06F 12/0246 |
| 9,075,708 B1 | 7/2015 | Kang et al. | |
| 2005/0231765 A1* | 10/2005 | So | G06F 17/30315 |
| | | | 358/1.16 |
| 2011/0233648 A1 | 9/2011 | Seol et al. | |
| 2013/0173850 A1* | 7/2013 | Song | G06F 12/0246 |
| | | | 711/103 |
| 2014/0195725 A1* | 7/2014 | Bennett | G06F 12/0246 |
| | | | 711/103 |
| 2014/0215129 A1 | 7/2014 | Kuzmin et al. | |
| 2014/0344498 A1 | 11/2014 | Sokolov et al. | |
| 2015/0046636 A1 | 2/2015 | Seo et al. | |
| 2015/0058532 A1 | 2/2015 | Sugimoto et al. | |

* cited by examiner

FIG. 4

| | 0 | 1 | 2 | 3 |
|---|---|---|---|---|
| | \multicolumn{4}{c}{COMMAND UPIU} |
| 0 | xx00 0001b | Flags | LUN | Task Tag |
| 4 | Reserved | Command Set Type | Reserved | Reserved |
| 8 | Total EHS Length (00h) | Reserved | (MSB) Data Segment Length (0000h) (LSB) | |
| 12 | (MSB) Expected Data Transfer Length (LSB) | | | |
| 16 | CDB[0] | CDB[1] | CDB[2] | CDB[3] |
| 20 | CDB[4] | CDB[5] | CDB[6] | CDB[7] |
| 24 | CDB[8] | CDB[9] | CDB[10] | CDB[11] |
| 28 | CDB[12] | CDB[13] | CDB[14] | CDB[15] |
| | Header E2ECRC (omit if HD=0) | | | |

OB1(SIG)

FIG. 6

| Bit<br>Byte | 7 | 6 | 5 | 4 | 3 | 2 | 1 | 0 |
|---|---|---|---|---|---|---|---|---|
| 0 | \multicolumn{8}{c}{OPERATION CODE (5Ah)} |
| 1 | Reserved = 000b ||| LLBAA = 0b | DBD = 1b | Reserved = 000b |||
| 2 | PC ||| \multicolumn{5}{c}{PAGE CODE} |
| 3 | \multicolumn{8}{c}{SUBPAGE CODE} |
| 4 | \multicolumn{8}{c}{} |
| 5 | \multicolumn{8}{c}{Reserved} |
| 6 | \multicolumn{8}{c}{} |
| 7 | (MSB) | \multicolumn{7}{c}{} |
| 8 | \multicolumn{7}{c}{ALLOCATION LENGTH} | (LSB) |
| 9 | \multicolumn{8}{c}{CONTROL = 00h} |

CDB

| | 0 | 1 | 2 | 3 |
|---|---|---|---|---|
| | xx10 0001b | Flags | LUN | Task Tag |
| 4 | Reserved | Reserved | Reserved | Reserved |
| 8 | Total EHS Length (00h) | Reserved | (MSB) Data Segment Length | (LSB) |
| 12 | (MSB) Data Buffer Offset | | | (LSB) |
| 16 | Data Transfer Count | | | |
| 20 | Reserved | | | |
| 24 | Reserved | | | |
| 28 | Reserved | | | |
| | Header E2ECRC (omit if HD=0) | | | |
| k | DATA[0] | DATA[1] | DATA[2] | DATA[3] |
| k+Length−4 | DATA[Length−4] ... DATA[Length−4] | DATA[Length−3] ... DATA[Length−3] | DATA[Length−2] ... DATA[Length−2] | DATA[Length−1] ... DATA[Length−1] |
| | Data E2ECRC (omit if DD=0) | | | |

DATA IN UPIU

Data Segment k = 32 if HD = 0

FIG. 13

| Bit<br>Byte | 7 | 6 | 5 | 4 | 3 | 2 | 1 | 0 | |
|---|---|---|---|---|---|---|---|---|---|
| 0 | OPERATION CODE (28h) ||||||||  |
| 1 | RDPROTECT = 000b ||| DPO | FUA | Reserved | FUA_NV | Obsolete | |
| 2 | (MSB) |||||||| |
| 3 | LOGICAL ADDRESS |||||||| LA |
| 4 |  |||||||| |
| 5 | (LSB) |||||||| |
| 6 | Reserved |||| GROUP NUMBER |||| |
| 7 | (MSB) |||||||| |
| 8 | TRANSFER LENGTH |||||||(LSB) | |
| 9 | CONTROL = 00h |||||||| |

CDB

FIG. 14

| Bit<br>Byte | 7 | 6 | 5 | 4 | 3 | 2 | 1 | 0 | |
|---|---|---|---|---|---|---|---|---|---|
| 0 | OPERATION CODE (88h) ||||||||  CDB |
| 1 | RDPROTECT = 000b ||| DPO | FUA | Reserved | FUA_NV | Reserved | |
| 2 | (MSB) |||||||| |
| ... | LOGICAL ADDRESS / PHYSICAL ADDRESS |||||||| OB4 |
| 9 | (LSB) |||||||| |
| 10 | (MSB) |||||||| |
| ... | TRANSFER LENGTH |||||||| |
| 13 | (LSB) |||||||| |
| 14 | Ignore | Reserved || GROUP NUMBER ||||| |
| 15 | CONTROL = 00h |||||||| |

FIG. 15

| Bit<br>Byte | 7 | 6 | 5 | 4 | 3 | 2 | 1 | 0 |
|---|---|---|---|---|---|---|---|---|
| 0 | colspan=8 | OPERATION CODE (55h) |
| 1 | Reserved | | | PF=1b | Reserved | | | SP |
| 2 | colspan=8 Reserved |
| 3 | |
| 4 | |
| 5 | |
| 6 | |
| 7 | colspan=8 PARAMETER LIST LENGTH |
| 8 | |
| 9 | colspan=8 CONTROL = 00h |

FIG. 28
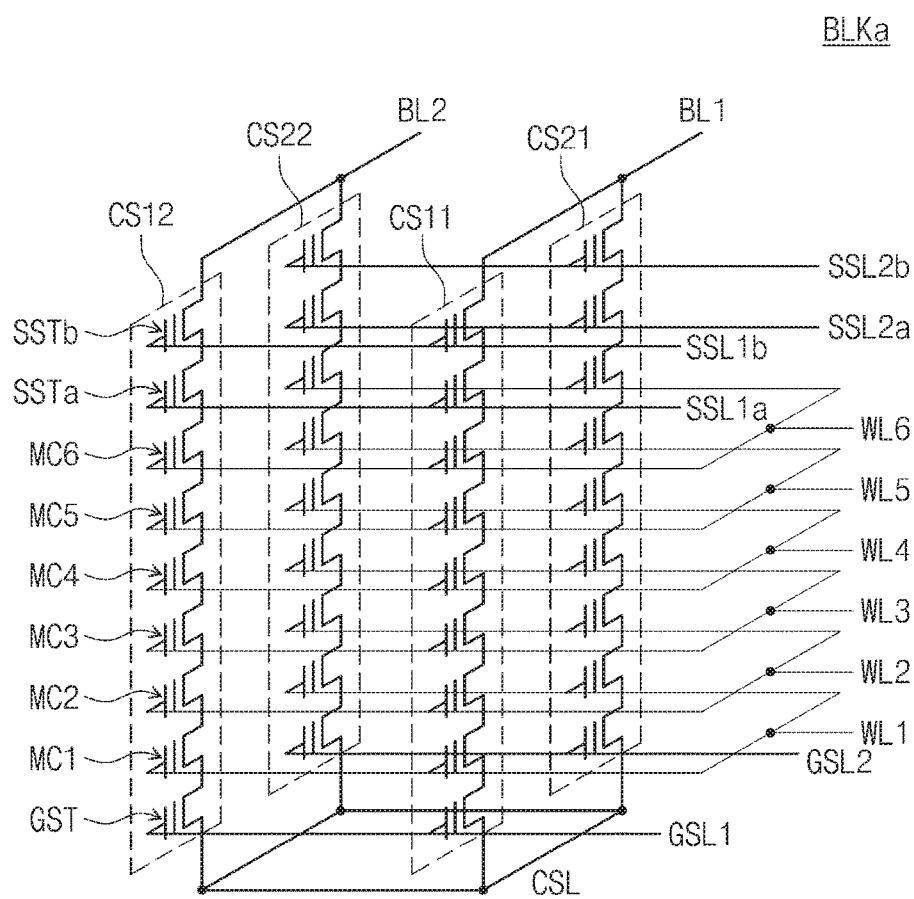
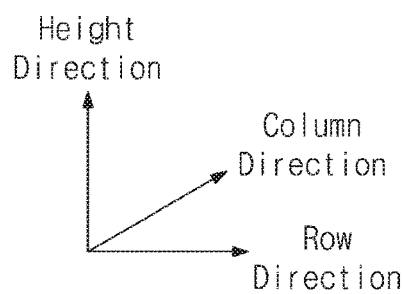

STORAGE DEVICE INCLUDING NONVOLATILE MEMORY DEVICE AND CONTROLLER, OPERATING METHOD OF STORAGE DEVICE, AND METHOD FOR ACCESSING STORAGE DEVICE

CROSS-REFERENCE TO RELATED APPLICATIONS

A claim for priority under 35 U.S.C. § 119 is made to Korean Patent Application Nos. 10-2015-0190035 filed Dec. 30, 2015, 10-2016-0074700 filed Jun. 15, 2016, and 10-2016-0160792 filed Nov. 29, 2016, in the Korean Intellectual Property Office, the entire contents of each of which are hereby incorporated by reference.

BACKGROUND

1. Field

At least some example embodiments of the inventive concepts described herein relate to a semiconductor memory, and more particularly, to a storage device including a nonvolatile semiconductor memory and a controller, an operating method of the storage device, and an access method of accessing the storage device.

2. Related Art

A storage device refers to a device which stores data under control of a host device such as a computer, a smartphone, or a smart pad. The storage device includes a device, which stores data on a magnetic disk, such as a hard disk drive (HDD), or a device, which stores data on a semiconductor memory, in particular, a nonvolatile memory, such as a solid state drive (SSD) or a memory card.

The nonvolatile memory includes a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

To reduce manufacturing costs of the storage device, a technology is being developed for removing a high-capacity buffer memory like a dynamic random access memory (DRAM) from the storage device. In general, the buffer memory of the storage device is used to store metadata that is needed to manage a nonvolatile memory device of the storage device. For example, the metadata may include map data that includes mapping information between physical addresses of the nonvolatile memory device and logical addresses used by the host device.

If the high-capacity buffer memory like the DRAM is removed from the storage device, the metadata may be managed by using a small-capacity, high-speed buffer memory in a controller of the storage device. However, a capacity of the buffer memory of the controller is smaller than a capacity of the metadata, in detail, a capacity of map data. Accordingly, in the case where map data needed to perform a write request or read request from the host device is not loaded on the buffer memory of the controller, there is accompanied an operation of loading the needed map data from the nonvolatile memory on the buffer memory of the controller. This causes an increase in a time period that is needed for the storage device to respond to the write request or read request of the host device. In other words, operating speeds of the storage device and a computing device including the storage device are lowered.

Accordingly, devices and methods are needed to prevent a response speed or operating speed from being lowered even though the large-capacity buffer memory like the DRAM is removed from the storage device.

SUMMARY

At least some example embodiments of the inventive concepts provide a storage device with an improved operating speed, an operating method of the storage device, and an access method of accessing the storage device.

According to at least some example embodiments, an operating method of a storage device that includes a nonvolatile memory device and a controller configured to control the nonvolatile memory device includes sending map data from the storage device to a host device, the map data mapping one or more of a plurality of physical addresses of the nonvolatile memory device to one or more of a plurality of logical addresses of the host device; receiving, at the storage device, a read request from the host device; if the read request includes a physical address, reading data from the nonvolatile memory device based on the included physical address; and if the read request does not include a physical address, translating a logical address of the read request into a first physical address, and reading data from the nonvolatile memory device based on the translated first physical address.

According to at least some example embodiments of the inventive concepts, a storage device includes a nonvolatile memory device; and a controller to control the nonvolatile memory device, wherein the controller is configured to send map data to a host device, the map data mapping one or more of a plurality of physical addresses of the nonvolatile memory device to one or more of a plurality of logical addresses of the host device, and wherein the controller is configured such that, if a read request received from the host device includes a physical address associated with the map data, the controller reads data from the nonvolatile memory device based on the physical address, and if a read request received from the host device does not include a physical address, the controller translates a logical address of the read request into a physical address, and reads data from the nonvolatile memory device based on the translated physical address.

According to at least some example embodiments of the inventive concepts, an operating method of a storage device that comprises a nonvolatile memory device and a controller configured to control the nonvolatile memory device includes mapping, by the storage device, physical addresses of the nonvolatile memory device and logical addresses of a host device and sending map data including version information to the host device; receiving, by the storage device, a read request from the host device; and based on whether the read request includes a first physical address and first version information and whether the first version information is the same as second version information stored in the controller, performing a read operation by using one of the first physical address and a second physical address that is obtained by converting a logical address of the read request.

According to at least some example embodiments of the inventive concepts, a method of performing a data access operation on a storage device that includes a nonvolatile memory device and a controller configured to control the nonvolatile memory device includes sending, from a host, a map data request; receiving, at the host, map data, the map data mapping one or more of a plurality of physical addresses of the nonvolatile memory device to one or more of a plurality of logical addresses of the host device; storing the map data at the host; and performing a read operation corresponding to a first logical address by, determining whether the stored map data includes mapping information of the first logical address, sending, from the host, a read request including a physical address that is mapped to the first logical address by the stored map data, if the stored map data includes mapping information of the first logical address, and sending, from the host, a read request that includes the first logical address, if the stored map data does not include mapping information of the first logical address.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 3 is a flowchart illustrating a method in which the storage device sends all or a portion of map data to a host device at power-on;

FIG. 4 shows an example of a map data request for requesting the map data from the storage device at the host device;

FIG. 6 shows another example of the command descriptor block of the map data request that is used for the host device to request the map data from the storage device;

FIG. 7 shows an example of a map data response that the storage device sends to the host device in response to a request of FIG. 5 or 6;

FIG. 13 shows an example of the command descriptor block of a read request that is used for the host device to request a read operation from the storage device;

FIG. 14 shows another example of the command descriptor block CDB of the read request that is used for the host device to request a read operation from the storage device 1300;

FIG. 15 shows an example of the command descriptor block that is used for the host device sends a plurality of physical addresses and signatures by using a separate command UPIU;

FIG. 28 is a circuit diagram illustrating a memory block according to at least some example embodiments of the inventive concepts.

DETAILED DESCRIPTION

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

Figure 1:
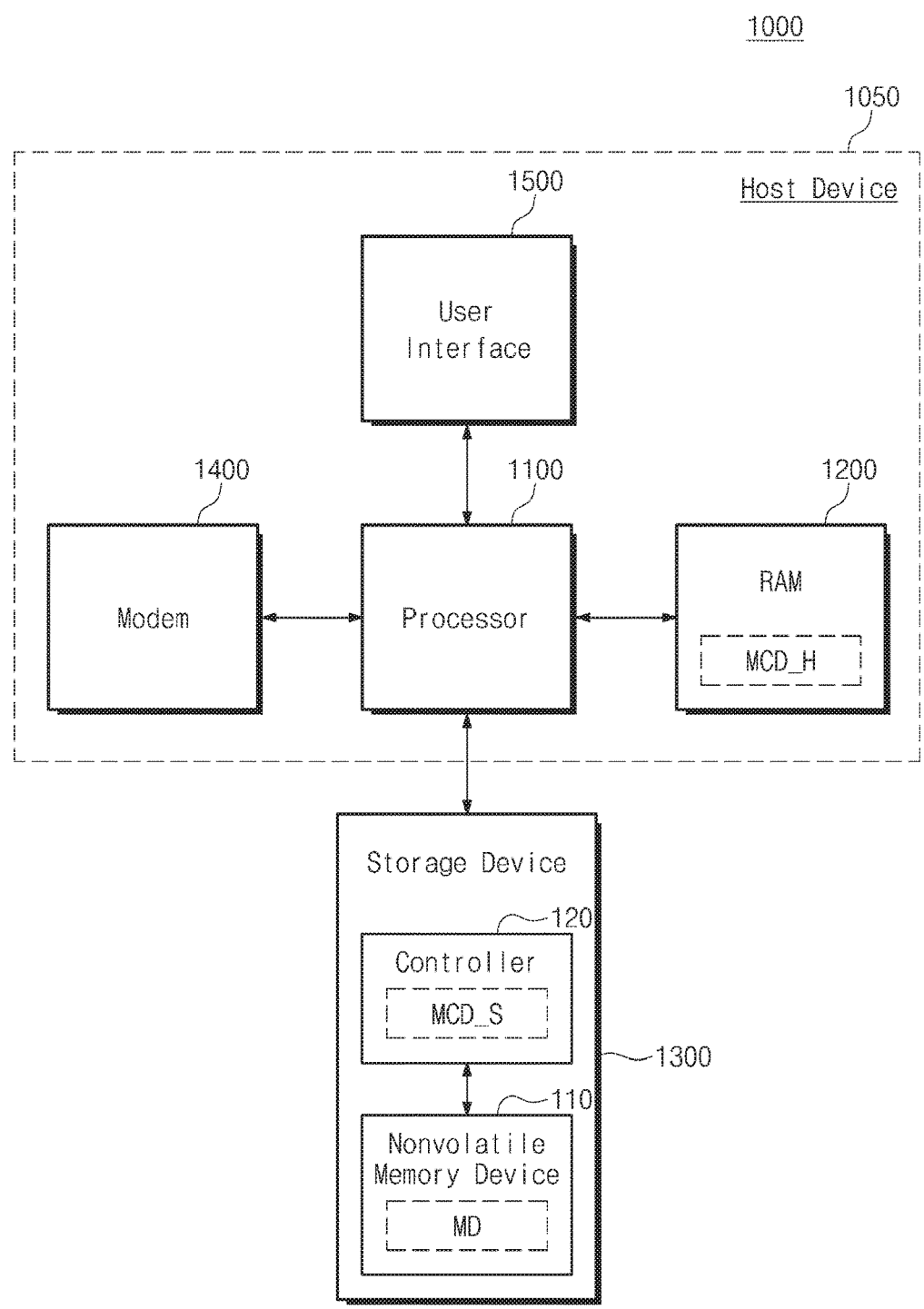
FIG. 1 is a block diagram illustrating a computing device according to at least some example embodiments of the inventive concepts.

FIG. 1 is a block diagram illustrating a computing device 1000 according to at least some example embodiments of the inventive concepts. Referring to FIG. 1, the computing device 1000 includes a processor 1100, a memory 1200, a storage device 1300, a modem 1400, and a user interface 1500.

The processor 1100 may control an overall operation of the computing device 1000 and perform a logical operation. The processor 1100 may be a hardware-based data processing device which includes a physical circuit configured to execute operations expressed by commands included in a code or program. For example, the processor 1100 may be a system-on-chip (SoC). The processor 1100 may be a general purpose processor, a specific-purpose processor, or an application processor. Further examples of the processor 1100 include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The RAM 1200 may communicate with the processor 1100. The RAM 1200 may be a main memory of the processor 1100 or the computing device 1000. The processor 1100 may store codes or data in the RAM 1200 temporarily. The processor 1100 may execute codes by using the RAM 1200 and may process data. The processor 1100 may execute a variety of software, such as an operating system and an application, by using the RAM 1200. The processor 1100 may control an overall operation of the computing device 1000 by using the RAM 1200. The RAM 1200 may include a volatile memory examples of which include a static RAM (SRAM), a dynamic RAM (DRAM), or a synchronous DRAM (SDRAM) and/or a nonvolatile memory examples of which include a phase change RAM (PRAM), a magnetic RAM (MRAM), a resistive RAM (RRAM), or a ferroelectric RAM (FRAM).

The storage device 1300 may communicate with the processor 1100. The storage device 1300 may store data for a long time. That is, the processor 1100 may store data, which is to be stored for a long time, in the storage device 1300. The storage device 1300 may store a boot image for driving the computing device 1000. The storage device 1300 may store source codes of a variety of software, such as the operating system and an application. The storage device 1300 may store data that is processed by a variety of software, such as the operating system and the application.

According to at least one example embodiment of the inventive concepts, the processor 1100 may drive a variety of software, such as the operating system and the application, by loading source codes stored at the storage device 1300 on the RAM 1200 and executing the loaded codes. The processor 1100 may load data stored in the storage device 1300 on the RAM 1200 and may process the loaded data on the RAM 1200. The processor 1100 may store long-term data among data, which is stored in the RAM 1200, in the storage device 1300.

The storage device 1300 may include a nonvolatile memory such as a flash memory, the PRAM, the MRAM, the RRAM, or the FRAM.

The modem 1400 may communicate with an external device under control of the processor 1100. For example, the modem 1400 may communicate with the external device in a wired or wireless manner.

The user interface 1500 may communicate with a user under control of the processor 1100. For example, examples of the user interface 1500 include, but are not limited to, user input interfaces such as a keyboard, a keypad, buttons, a touch panel, a touch screen, a touch pad, a touch ball, a camera, a microphone, a gyroscope sensor, and a vibration sensor. The user interface 1500 may further include user output interfaces such as a liquid crystal display (LCD), an organic light-emitting diode (OLED) display device, an active matrix OLED (AMOLED) display device, a light-emitting diode (LED), a speaker, and a motor.

According to at least one example embodiment of the inventive concepts, the storage device 1300 includes a nonvolatile memory device 110 and a controller 120. The nonvolatile memory device 110 may provide main storage to the computing device 1300. The controller 120 may control write, read, and erase operations of the nonvolatile memory device 110 in response to a request of a host device 1050. The controller 120 may perform various background operations to manage the nonvolatile memory device 110, regardless of control of the host device 1050. The controller 120 may manage a variety of metadata needed to manage the nonvolatile memory device 110. The metadata may be stored in the nonvolatile memory device 110 and may be read and used from the nonvolatile memory device 110 when the controller 120 needs it.

According to at least one example embodiment of the inventive concepts, the metadata managed by the controller 120 may include map data MD. The map data MD may include mapping information between physical addresses of a storage space of the nonvolatile memory device 110 and logical addresses assigned by the host device 1050 to the storage device 1300. The map data MD may be stored in the nonvolatile memory device 110. The controller 120 may load a portion of the map data MD, which is needed to perform a request from the host device 1050 or a background operation, on a buffer memory of the controller 120 as the storage map cache data MCD_S. For example, the buffer memory of the controller 120 may be an SRAM. If storage map cache data MCD_S is updated upon performance of an operation corresponding to a request of the host device 1050 or a background operation, the updated portion may be written in the nonvolatile memory device 110 such that the updated portion is applied to the map data MD of the nonvolatile memory device 110.

The capacity of the buffer memory in the controller 120 may be smaller than a size of the map data MD. Accordingly, it may not be possible to load the whole map data MD on the controller 120. If a portion of the map data MD, which is needed to perform the request of the host device 1050 or the background operation, is not loaded on the controller 120 as the storage map cache data MCD_S, the controller 120 may delete a portion of the storage map cache data MCD_S or write it in the nonvolatile memory device 110 and read a necessary portion from the nonvolatile memory device 110. This causes an increase in a time period needed to perform the request of the host device 1050 or the background operation.

To prevent the above-described issue, the storage device 1300 according to at least some example embodiments of the inventive concepts is configured to send all or a portion of the map data MD to the host device 1050. The host device 1050 is configured to store all or a portion of the map data MD from the storage device in the RAM 1200 as host map cache data MCD_H. Afterwards, the host device 1050 may send a read request, which includes a physical address, to the storage device 1300 with reference to the host map cache data MCD_H. If the read request includes the physical address, the controller 120 may perform address conversion or skip an operation of reading a specific portion of the map data MD from the nonvolatile memory device 110. Accordingly, since a time period, which is needed for the storage device 1300 to perform the request of the host device 1050, is reduced, operating speeds of the storage device 1300 and the computing device 1000 may be improved.

Also, the host map cache data MCD_H stored in the RAM 1200 of the host device 1050 1000 is managed by the host device 1050, not the storage device 1300. Since there is no need to hand over the authority to manage the RAM 1200 of the host device 1050 to the storage device 1300, at least some example embodiments of the inventive concepts may be available to use without changing existing interfaces between the host device 1050 and the storage device 1300. Accordingly, implementing the processes and/or apparatuses according to at least some example embodiments of the inventive concepts may result in reduced costs in comparison to costs associated with implementing some other possible processes and/or apparatuses for storing storage device map data on a host device.

Figure 2:
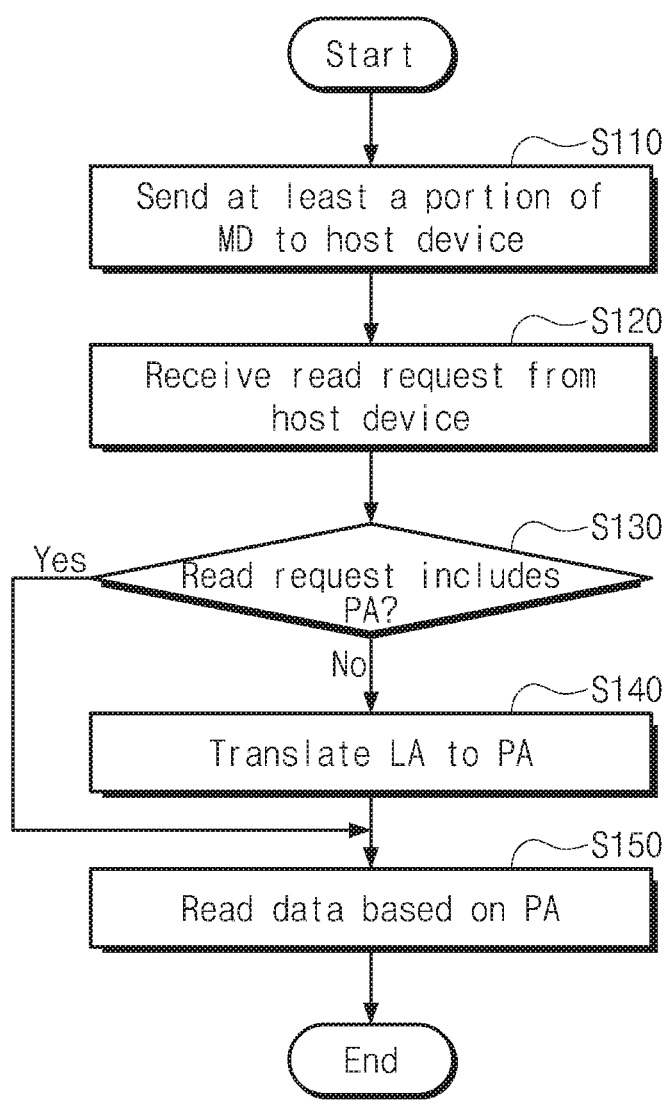
FIG. 2 is a flowchart illustrating an operating method of a storage device according to at least some example embodiments of the inventive concepts.

FIG. 2 is a flowchart illustrating an operating method of the storage device 1300 according to at least some example embodiments of the inventive concepts. Referring to FIGS. 1 and 2, in operation S110, the storage device 1300 may send at least a portion of the map data MD to the host device 1050. For example, the controller 120 may send the storage map cache data MCD_S loaded on the buffer memory therein to the host device 1050. The controller 120 may read a portion of the map data MD from the nonvolatile memory device 110, store the read portion thereof as the storage map cache data MCD_S, and send the stored storage map cache data MCD_S to the host device 1050.

In operation S120, the storage device 1300 may receive a read request from the host device 1050. For example, the controller 120 may receive the read request, which includes a read command and an address, from the host device 1050.

In operation S130, the storage device 1300 may determine whether the read command received from the host device 1050 includes a physical address PA. For example, if information of an address exists in a portion of the read request from the host device 1050, which is assigned such that the physical address PA is located, the host device 1050 contoller 120 may recognize the address as the physical address PA. As another example, since an address in the read request received from the host device 1050 is out of a band, the controller 120 may recognize an out-of-band portion as the physical address PA. If the read request includes a physical address, operation S140 is skipped, and then the procedure proceeds to operation S150. If the read request does not include a physical address, the procedure proceeds to operation S150 after operation S140 is performed.

In operation S140, the controller 120 may translate a logical address LA included in the read request into the physical address PA. For example, when a portion of the map data MD, which is needed for translation, is loaded on the controller 120 as the storage map cache data MCD_S, the controller 120 may translate the logical address LA in the read request into the physical address PA with reference to the storage map cache data MCD_S. When the portion of the map data MD, which is needed for translation, is not loaded on the controller 120 as the storage map cache data MCD_S, the controller 120 may read the portion for translation from the nonvolatile memory device 110. When the capacity of the buffer memory in the controller 120 is insufficient, the controller 120 may delete all or a portion of the storage map cache data MCD_S and read the portion for translation from the nonvolatile memory device 110. When a portion of the storage map cache data MCD_S corresponding to a delete target is updated after read from the nonvolatile memory device 110, the controller 120 may write the updated portion into the nonvolatile memory device 110 so as to be applied to the map data MD and delete the updated portion. For example, the controller 120 may select a portion of the storage map cache data MCD_S corresponding to the delete target based on a least recently used (LRU) manner.

In operation S150, the controller 120 may read data from the nonvolatile memory device 110 by using the physical address PA that is received from the host device 1050 or is translated with reference to the storage map cache data MCD_S.

As described above, if a read operation is performed based on the physical address PA received from the host device 1050, an operation, in which the controller 120 translates the logical address LA into the physical address PA is unnecessary, thereby improving the operating speeds of the storage device 1300 and the computing device 1000.

Figure 3:
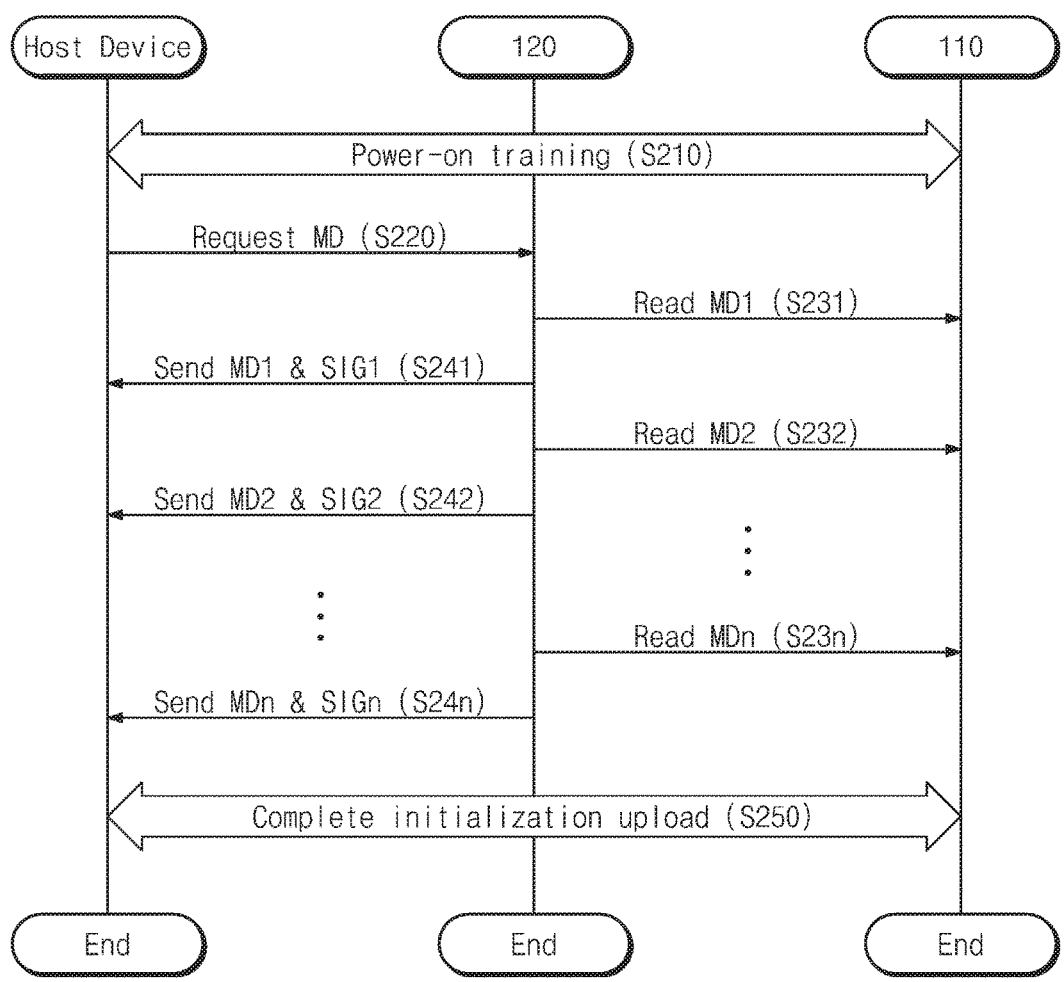

FIG. 3 is a flowchart illustrating a method in which the storage device 1300 sends all or a portion of the map data MD to the host device 1050 at power-on. Referring to FIGS. 1 and 3, in operation S210, the host device 1050, the controller 120, and the nonvolatile memory device 110 perform power-on training. The power-on training may include ZQ training for calibrating a termination resistance, link training for calibrating a sink or skew, and an initialization communication for exchanging information for communication.

In operation S220, the host device 1050 may request the map data MD from the controller 120. For example, the host device 1050 may designate and request a specific portion of the map data MD. For example, the host device 1050 may designate and request a portion of the map data MD, in which data needed to drive the computing system 1000, such as a file system, a boot image, and an operating system, is stored. As another example, the host device 1050 may request the map data MD from the controller 120 without any designation.

In operation S231, the controller 120 may read a first portion MD1 of the map data MD from the nonvolatile memory device 110. The first portion MD1 may be stored in the controller 120 as the storage map cache data MCD_S. In operation S241, the controller 120 may send the first portion MD1, which is stored as the storage map cache data MCD_S, to the host device 1050. The first portion MD1 may be stored in the RAM 1200 as the host map cache data MCD_H.

In operation S232, the controller 120 may read a second portion MD2 of the map data MD from the nonvolatile memory device 110, and store the second portion MD2 in the controller 120 as the storage map cache data MCD_S. In operation S242, the controller 120 may send the second portion MD2, which is stored as the storage map cache data MCD_S, to the host device 1050. The second portion MD2 may be stored in the RAM 1200 as the host map cache data MCD_H, by the host device 1050.

In operation S23n, the controller 120 may read an n-th portion MDn of the map data MD from the nonvolatile memory device 110, and store the n-th portion MDn in the controller 120 as the storage map cache data MCD_S. In operation S24n, the controller 120 may send the n-th portion MDn, which is stored as the storage map cache data MCD_S, to the host device 1050. The n-th portion MDn may be stored in the RAM 1200 as the host map cache data MCD_H, by the host device 1050.

In operation S250, the host device 1050, the controller 120, and the nonvolatile memory device 110 may complete initialization upload.

As described above, the host device 1050 and the storage device 1300 may update all or a portion of the map data MD on the RAM 1200 after the power-on training is completed. For example, all or a portion of the map data MD may be sent to the host device 1050 by performing a plurality of read operations with respect to the nonvolatile memory device 110 and a plurality of transmission operations between the nonvolatile memory device 110 the host device 1050. However, at least some example embodiments of the inventive concepts are not limited thereto. For example, all or a portion of the map data MD may be sent to the host device 1050 by performing one read operation and one transmission operation.

If the initialization update is completed, the host device 1050 may start normally an access to the storage device

1300. At least one example embodiment is illustrated in FIG. 3 as the host device 1050 and the storage device 1300 perform the initialization upload. However, at least some example embodiments of the inventive concepts are not limited thereto. For example, the initialization upload may be omitted. The host device 1050 may perform normally an access to the storage device 1300 without the initialization upload.

FIG. 4 shows an example of a map data request for requesting the map data MD from the storage device 1300 at the host device 1050. According to at least one example embodiment of the inventive concepts, the map data request will be described with reference to a command UFS protocol information unit (UPIU) of universal flash storage (UFS). However, the map data request, which the host device 1050 sends to the storage device 1300, is not limited to the command UPIU of the UFS. The map data request may be appropriately selected according to a type of an interface between the host device 1050 and the storage device 1300.

The command UPIU may include 0th to 31st blocks, for example, 0th to 31st bytes. The 0th block indicates a transaction type. For example, in the command UPIU, the 0th block may be "xx00 0001b".

The 1st block indicates a flag. The flag may include a read flag indicating a read operation, a write flag indicating a write operation, and a characteristic flag indicating a characteristic. For example, the read flag indicates that the command UPIU is associated with the read operation. The write flag indicates that the command UPIU is associated with the write operation. The characteristic flag indicates whether the command UPIU is simple, ordered, or enqueued in a head of a queue.

The 2nd block indicates a logical unit number (LUN) of a target device. The 3rd block indicates a task tag.

A portion of the 4th block is used as a first option block OB1, and the other thereof indicates a command set type. For example, the command set type may include a small computer system interface (SCSI) command set, a UFS specific command set, a vendor specific command set, etc.

The 5th to 7th blocks may be used as the first option block OB1. The 8th block indicates the whole length of an extra header segment (EHS). The 9th block may be used as the first option block OB1. The 10th and 11st blocks indicate a data segment length and indicate a most significant bit (MSB) and a least significant bit (LSB), respectively. The data segment length indicates the number of valid bytes of a data segment.

The 12nd to 15th blocks indicate a size of data, which the host device 1050 will receive from the storage device 1300, or a size of data, which the host device 1050 will send to the storage device 1300.

The 16th to 31st blocks may include 0th to 15th command descriptor blocks CDB[0] to CDB[15], respectively. The 16th to 31st blocks may include UFS or SCSI based command and address.

An end-to-end cyclic redundancy check (CRC) code (Header E2ECRC) of the header may be added after the 31st block of the command UPIU. For example, in the case where a first bit HD of a 0th field is "0", the end-to-end CRC code of the header may be omitted.

The portion of the 4th block, the 5th to 7th blocks, and the 9th block may be used as the first option block OB1. The first option block OB1 may include a signature SIG related with the physical address PA when the command UPIU includes a physical address PA. When the command UPIU does not include a physical address PA, the first option block OB1 may not include the signature SIG related with the physical address PA. When the first option block OB1 does not include the signature SIG, at least a portion of the first option block OB1 may be used as a reserved block. When the first option block OB1 includes the signature SIG, also, at least a portion of the first option block OB1 may be used as a reserved block. The signature SIG will be more fully described with reference to accompanying drawings.

Figure 5:
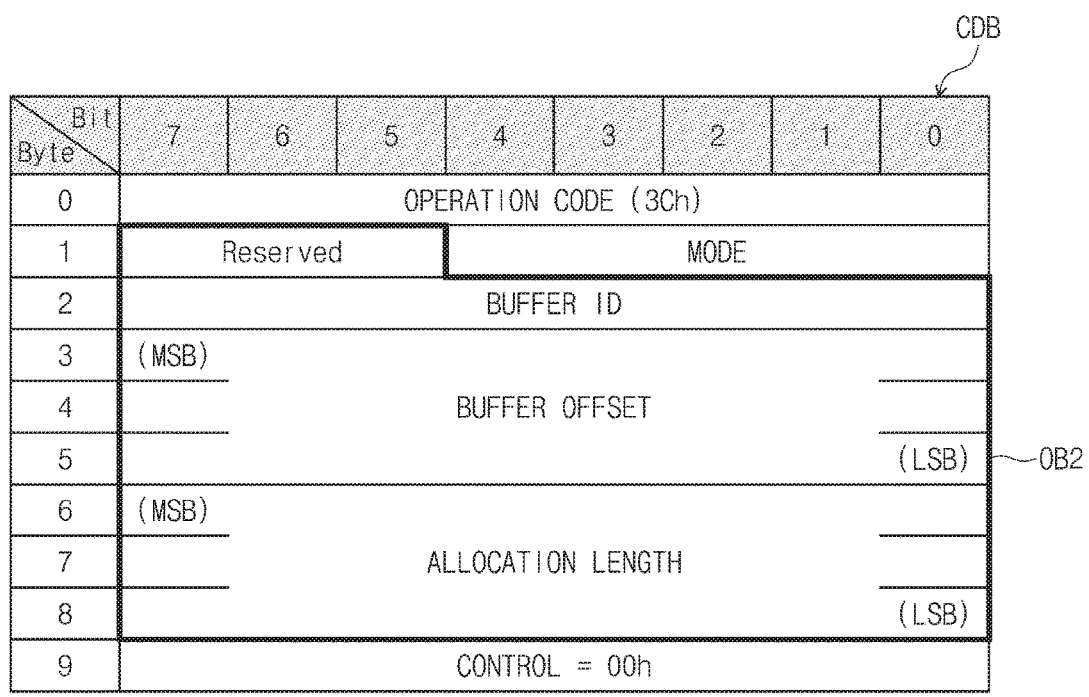
FIG. 5 shows an example of a command descriptor block of the map data request that is used for the host device to request the map data from the storage device.

FIG. 5 shows an example of a command descriptor block CDB of the map data request that is used for the host device 1050 to request the map data MD from the storage device 1300. According to at least one example embodiment of the inventive concepts, the map data request will be described with reference to the command descriptor block CDB of a read buffer command of the UFS. However, the map data request, which the host device 1050 sends to the storage device 1300, is not limited to the command descriptor block CDB of the read buffer command of the UFS. The map data request may be appropriately selected according to a type of an interface between the host device 1050 and the storage device 1300.

Referring to FIGS. 1, 4, and 5, respective rows of the command descriptor block CDB indicate respective bytes thereof, respectively. According to at least one example embodiment of the inventive concepts, the command descriptor block CDB of the read buffer command may include 0th to 9th bytes. Columns of the command descriptor block CDB indicate bits of each byte thereof, respectively. For example, each byte may include 0th to 7th bits.

The 0th to 7th bits of the 0th byte in the command descriptor block CDB indicate an operation code. For example, the operation code of the read buffer command may be "3Ch".

The 0th to 4th bits of the 1st byte in the command descriptor block CDB of the read buffer command indicate a mode. For example, the mode may include vendor specific or data. The 9th byte of the command descriptor block CDB may include "CONTROL". For example, the CONTROL may be "00h".

The rest configuration of the command descriptor block CDB of the read buffer command when the read buffer command is used for a general purpose may be different from that when the read buffer command is used to request the map data MD. For example, the general purpose of the read buffer command may be a purpose that is adopted by the specification of the UFS or a vendor as a purpose except for a request of the map data MD, such as testing of a buffer memory of a logic unit, testing of integrity of a service delivery subsystem, downloading of a microcode of the storage device 1300, acquisition of an error history and statistics of the storage device 1300, and tunneling of a command and data.

When the read buffer command is used for the general purpose, the 5th to 7th bits of the 1st byte in the command descriptor block CDB may be used as a reserved block. The 0th to 7th bits of the 2nd byte in the command descriptor block CDB may be used as a buffer identifier (ID). The buffer identifier may identify a buffer in the logic unit. The 3rd to 5th bytes in the command descriptor block CDB may indicate a buffer offset. The buffer offset may include bits from an LSB up to an MSB. The buffer offset may indicate a byte offset of a buffer identified by the buffer identifier. The 6th to 8th bytes in the command descriptor block CDB may indicate an allocation length. The allocation length may include bits from an LSB up to an MSB. The allocation length may indicate the number of bytes from a byte offset that the host device 1050 wants to receive.

When the read buffer command is used for the request of the map data MD, the 5th to 7th bits of the 1st byte and 2nd to 8th bytes in the command descriptor block CDB may be used as a second option block OB2. The second option block OB2 may include an argument or description indicating the request of the map data MD. The second option block OB2 may include information about a portion of the map data MD that the host device 1050 wants to receive. For example, the second option block OB2 may include logical (or physical) addresses associated with the portion of the map data MD, which the host device 1050 wants to receive, or information about the logical (or physical) addresses. The second option block OB2 may include information about a size of the map data MD that the host device 1050 wants to receive.

FIG. 6 shows another example of the command descriptor block CDB of the map data request that is used for the host device 1050 to request the map data MD from the storage device 1300. According to at least one example embodiment of the inventive concepts, the map data request will be described with reference to the command descriptor block CDB of a mode sense command of the UFS. However, the map data request, which the host device 1050 sends to the storage device 1300, is not limited to the command descriptor block CDB of the mode sense command of the UFS. The map data request may be appropriately selected according to a type of an interface between the host device 1050 and the storage device 1300.

Referring to FIGS. 1, 4, and 6, rows of the command descriptor block CDB indicate bytes thereof, respectively. According to at least one example embodiment of the inventive concepts, the command descriptor block CDB of the mode sense command may include 0th to 9th bytes. Columns of the command descriptor block CDB indicate bits of each byte thereof, respectively. For example, each byte may include 0th to 7th bits.

The 0th to 7th bits of the 0th byte in the command descriptor block CDB indicate an operation code. For example, the operation code of the mode sense command may be "5Ah".

A 3rd bit of the 1st byte in the command descriptor block CDB indicates a value of "DBD" and may be set to "1b". A 4th bit of the 1st byte in the command descriptor block CDB indicates a value of "LLBAA" and may be set to "0b". The 9th byte of the command descriptor block CDB may include "CONTROL". For example, the CONTROL may be "00h".

The rest configuration of the command descriptor block CDB of the mode sense command when the mode sense command is used for a general purpose may be different from that when the mode sense command is used to request the map data MD. For example, the general purpose of the mode sense command may be a purpose that is adopted by the specification of the UFS or a vendor as a purpose except for the request of the map data MD, such as requesting of parameters in the storage device 1300.

When the mode sense command is used for the general purpose, the 0th to 2nd bits and 5th to 7th bits of the 1st byte in the command descriptor block CDB may be used as a reserved block. The 0th to 5th bits of the 2nd byte in the command descriptor block CDB indicate a page code. The page code may identify a page mode page to be returned. The 6th and 7th bits in the command descriptor block CDB indicate a page control PC. The page control PC may identify a type of mode parameter values to be returned from mode pages. For example, the page control PC may identify a return of a current value, a return of a bit mask indicating a changeable value, a return of default values, or a return of stored values. The 3rd byte of the command descriptor block CDB may include a subpage code. The subpage code may identify a subpage mode page to be returned. The 4th to 6th bytes in the command descriptor block CDB may be reserved. The 7th and 8th bytes in the command descriptor block CDB may indicate an allocation length. The allocation length may include an LSB from an MSB. The allocation length may indicate the number of bytes of pages that the host device 1050 wants to receive.

When the mode sense command is used for the request of the map data MD, the 0th to 2nd bits of the 1st byte and 5th to 7th bits and 2nd to 8th bytes in the command descriptor block CDB may be used as a third option block OB3. The third option block OB3 may include an argument or description indicating the request of the map data MD. The third option block OB3 may include information about a portion of the map data MD that the host device 1050 wants to receive. For example, the third option block OB3 may include logical (or physical) addresses associated with the portion of the map data MD, which the host device 1050 wants to receive, or information about the logical (or physical) addresses. The third option block OB3 may include information about a size of the map data MD that the host device 1050 wants to receive.

FIG. 7 shows an example of a map data response that the storage device 1300 sends to the host device 1050 in response to the request of FIG. 5 or 6. According to at least one example embodiment of the inventive concepts, a map data response will be described with reference to a data in UPIU of the UFS. However, the map data response, which the storage device 1300 sends to the host device 1050, is not limited to the data in UPIU of the UFS. The map data response may be appropriately selected according to a type of an interface between the host device 1050 and the storage device 1300.

Referring to FIGS. 1 and 7, the data in UPIU includes 0th to 31st blocks, for example, 0th to 31st bytes. The 0th block indicates a transaction type. In the data in UPIC, the transaction type may be "xx10 0010b" The 1st block indicates a flag. The 2nd block indicates a logical unit number (LUN). The 3rd block indicates a task tag.

The 4th to 7th blocks of the data in UPIU may be reserved blocks. The 8th block indicates the whole length of an extra header segment (EHS). The 9th block may be a reserved block. The 10th and 11st blocks indicate a data segment length and include a most significant bit (MSB) to a least significant bit (LSB). The data segment length indicates the number of valid bytes of a data segment. The 12nd and 15th blocks indicate a data buffer offset and include a most significant bit (MSB) to a least significant bit (LSB). The data buffer offset indicates an offset of data, which is included in the data in UPIU, of the whole data. The 16th to 19th blocks indicate a data transfer count and include a most significant bit (MSB) to a least significant bit (LSB). The data transfer count indicates the number of bytes loaded on a data segment, in more detail, the number of valid bytes.

The 20th to 31st blocks in the data in UPIU may be reserved blocks. An end-to-end CRC code (Header E2ECRC) of a header may be optionally added after the 31st block of the data in UPIU. For example, in the case where a first bit HD of a 0th field is "0", the end-to-end CRC code of the header may be omitted.

The data segment is added after the end-to-end CRC code of the header or the 31st block. The data segment includes "k" to "k+length−1" segments DATA[0] to DATA[Length−1]. When the end-to-end CRC code of the header is omitted, that is, when the first bit HD of the 0th field is "0", "k" may be 32. The length may be a value designated by the data segment length of the 10th and 11st blocks.

An end-to-end CRC code of data (DATA E2ECRC) may be optionally added after a "k+length−1" field of the data in UPIU. For example, in the case where a second bit DD of the 0th field is "0", the end-to-end CRC code of data (DATA E2ECRC) may be omitted.

The storage device 1300 may send the map data MD to the host device 1050 after loading it on the data segment. For example, the storage device 1300 may send map data MD, which corresponds to a logical address or size requested by the host device 1050, to the host device 1050 after loading it on the data segment.

Figure 8:
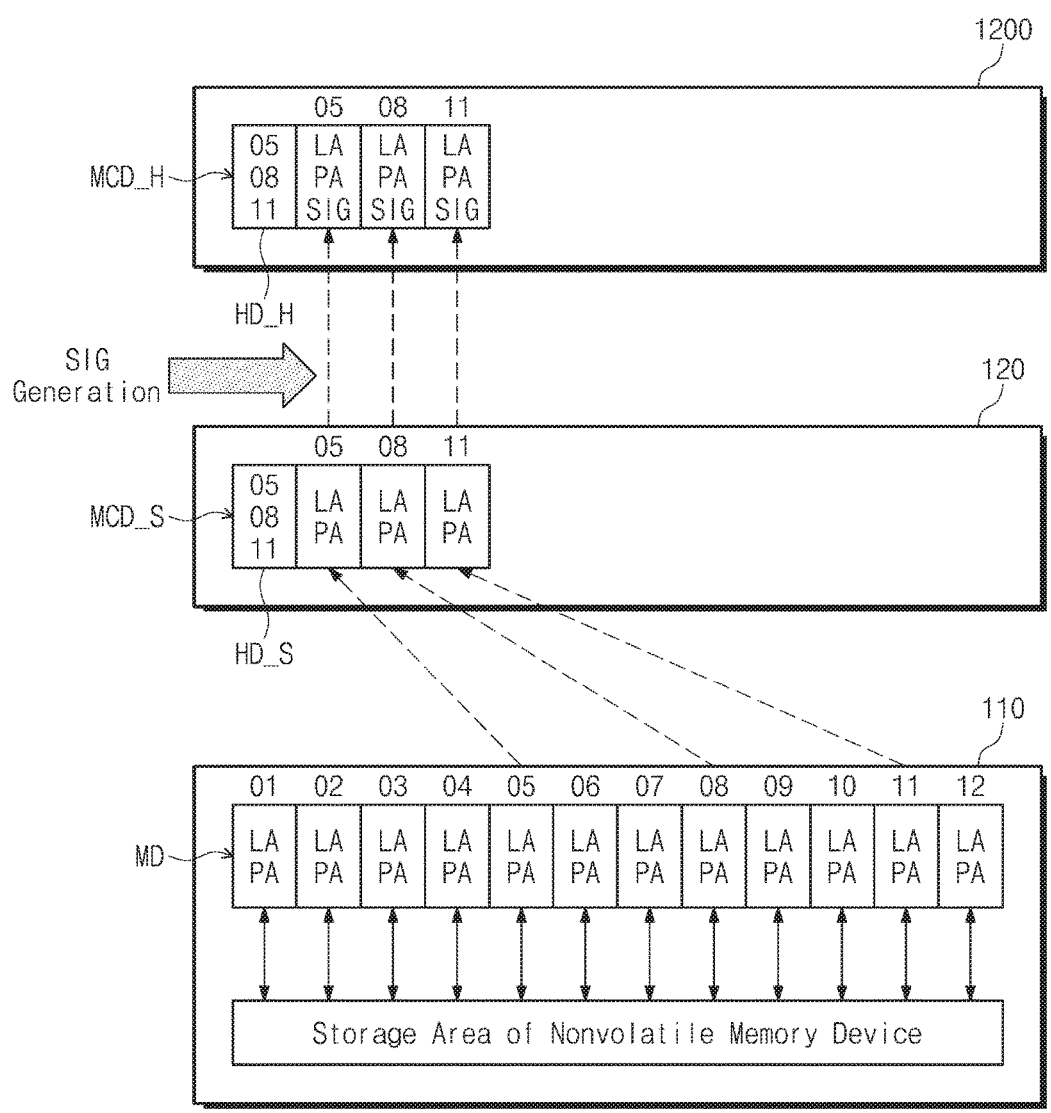
FIG. 8 is an illustration for explaining an example in which the map data, storage map cache data, and host map cache data are respectively managed on a nonvolatile memory device, a controller, and a RAM of the host device.

FIG. 8 shows an example in which the map data MD, the storage map cache data MCD_S, and the host map cache data MCD_H are respectively managed on the nonvolatile memory device 110, the controller 120, and the RAM 1200 of the host device 1050. Referring to FIGS. 1 and 8 the map data MD store the nonvolatile memory device 110 may include mapping information between physical addresses PA of a storage space of the nonvolatile memory device 110 and logical addresses LA. The map data MD may be managed in units of map data blocks. Each map data block may include a plurality of entries, each of which includes mapping information between consecutive logical addresses LA and consecutive physical addresses PA.

Offsets (or identifiers) 01 to 12 may be assigned to map data blocks, respectively. For example, the offsets 01 to 12 may be assigned according to physical addresses PA of the nonvolatile memory device 110 at which the map data blocks are respectively stored or according to logical addresses LA or physical address PA mapped at the map data blocks. For example, physical addresses of the nonvolatile memory device 110 or logical addresses assigned to the nonvolatile memory device 110 may be partitioned at regular intervals such that mapping information associated with each partitioned group forms each map data block.

The controller 120 may read the map data MD from the nonvolatile memory device 110 in units of map data blocks and store the read map data MD as the storage map cache data MCD_S. The controller 120 may generate a header HD_S when storing the storage map cache data MCD_S. The header HD_S may include offsets of map data blocks stored as the storage map cache data MCD_S in the controller 120.

The controller 120 may generate the signature SIG when sending the storage map cache data MCD_S to the host device 1050. For example, the signature SIG may be generated based on a logical address LA and a physical address PA of each entry included in each map data block. For example, the controller 120 may generate additional data by performing AES (Advanced Encryption Standard)-based encryption, a hash function, or scrambling with respect to the logical address LA and the physical address PA of each entry of each map data block. The controller 120 may select all or a portion of the generated additional data as the signature SIG. The controller 120 may send the logical addresses LA, the physical addresses PA, and the signatures SIG of the map data blocks together with the offsets.

The RAM 1200 of the host device 1050 may store the map data blocks including signatures SIG from the controller 120 as the host map cache data MCD_H. The host device 1050 may generate a header HD_H when storing the host map cache data MCD_H. The header HD_H may include offsets of map data blocks stored as the host map cache data MCD_H. Each map data block stored as the host map cache data MCD_H may include the logical addresses LA, the physical addresses PA, and the signatures SIG.

According to at least one example embodiment of the inventive concepts, the host device 1050 may send an offset of a desired map data block to the controller 120 when requesting the map data MD from the controller 120. When a map data block is received from the controller 120, the host device 1050 may compare an offset of the received map data block with an offset of the header HD_H and select new addition or update based on the comparison result. When requesting a read operation from the controller 120, the host device 1050 may send a physical address and an offset of a map data block in which the physical address is included. The controller 120 may determine whether a map data block is stored in the storage map cache data MCD_S, by comparing an offset of the received map data block with an offset registered in the header HD_S.

According to at least one example embodiment of the inventive concepts, a size of a space of the RAM 1200 assigned to store the host map cache data MCD_H may be smaller than or equal to a size of the map data MD. When the size of the space assigned to the host map cache data MCD_H is smaller than the size of the map data MD, the host device 1050 may select a release policy of the host map cache data MCD_H. For example, when a storage space assigned to the host map cache data MCD_H is insufficient to store a new map data block, the host device 1050 may discard a portion of the host map cache data MCD_H based on an LRU policy.

According to at least one example embodiment of the inventive concepts, a size of a space of the RAM 1200 assigned to store the host map cache data MCD_H may be greater than the size of the map data MD. A portion, of which the size is greater than the size of the map data MD, may be reserved for other uses. For example, when the map data MD of the storage device 1300 is updated due to garbage collection or wear leveling, the controller 120 may send the updated portion to the host device 1050. A reserved space may be used to store the updated portion. An old portion of the host map cache data MCD_H corresponding to the updated portion may be invalidated.

Figure 9:
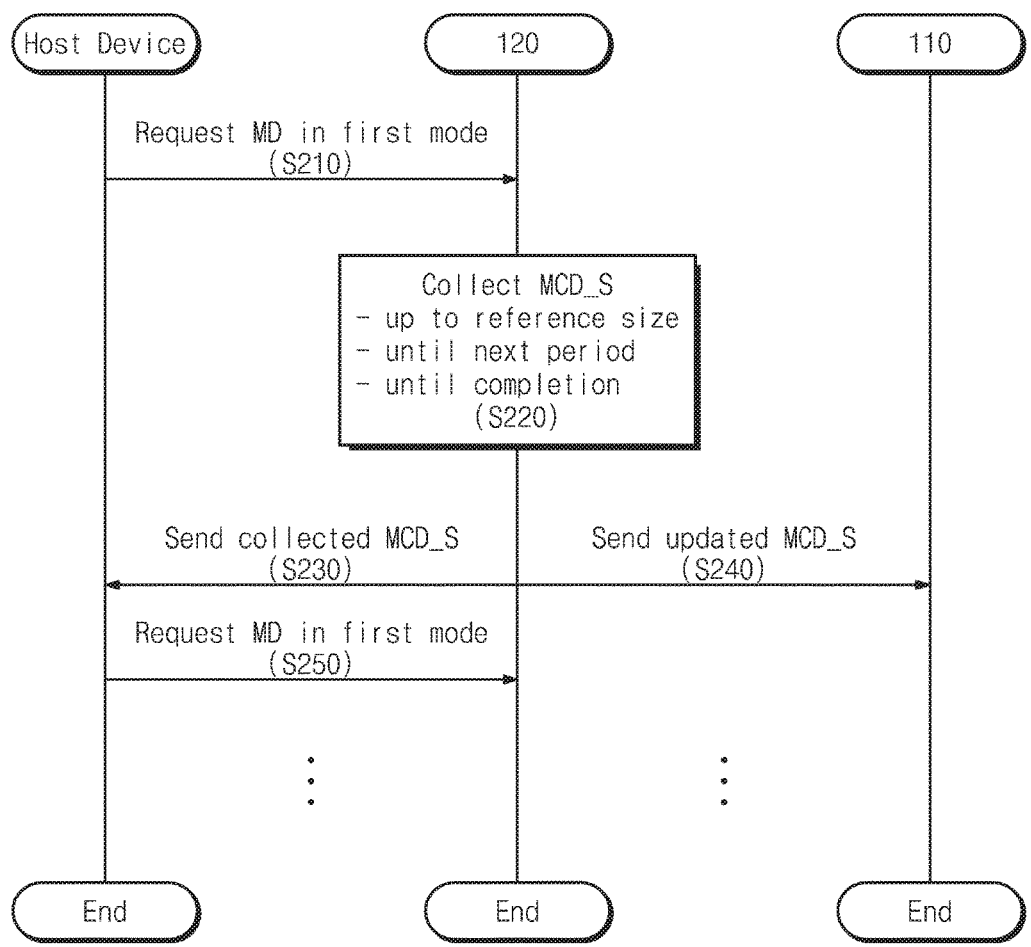
FIG. 9 is a flowchart illustrating a method in which the host device requests the map data from the storage device in a first mode.

FIG. 9 is a flowchart illustrating a method in which the host device 1050 requests the map data MD from the storage device 1300 in a first mode. Referring to FIGS. 1 and 9, in operation S210, the host device 1050 may request the map data MD from the controller 120 in the first mode. According to at least one example embodiment of the inventive concepts, the first mode may be designated in the second option block OB2 of FIG. 5 or the third option block OB3 of FIG. 6.

In operation S220, the controller 120 may collect updated storage map cache data MCD_S in response to the map data request of the first mode. For example, the controller 120 may collect storage map cache data MCD_S newly added to the storage map cache data MCD_S of the controller 120 after read from the map data MD stored in the nonvolatile memory device 110. For example, the controller 120 may collect storage map cache data MCD_S, in which a mapping relation between logical addresses LA and physical addresses PA is updated after loaded on the controller 120 as the storage map cache data MCD_S, of the map data MD stored in the nonvolatile memory device 110. For example, storage map cache data MCD_S, which is previously sent to the host device 1050 but is not updated, may be excluded from a collection target.

For example, the controller 120 may collect updated storage map cache data MCD_S until a size of collected storage map cache data MCD_S reaches a reference size, until a next period approaches after collection of updated map cache data MCD_S starts, or until a pending host request is absent in the storage device 1300 (i.e., no pending host requests remain in the storage device 1300), for example, because all requests issued from the host device 1050 have been completed.

If the updated storage map cache data MCD_S is completely collected, in operation S230, the controller 120 may send the collected storage map cache data MCD_S to the host device 1050. In operation S240, the controller 120 may write updated map cache data MCD_S of the collected map cache data MCD_S in the nonvolatile memory device 110.

According to at least one example embodiment of the inventive concepts, operations S230 and S240 may be performed at the same time. For example, an operation in which the controller 120 sends the collected storage map cache data MCD_S to the host device 1050 and an operation in which the controller 120 writes (or backs up) the updated storage map cache data MCD_S in the nonvolatile memory device 110 may be shadowed each other. For example, when the controller 120 sends the collected storage map cache data MCD_S to the host device 1050, the controller 120 may write the updated storage map cache data MCD_S in the nonvolatile memory device 110 together with the sending of the storage cache map data MCD_S. For example, when the controller 120 writes the updated storage map cache data MCD_S in the nonvolatile memory device 110, the controller 120 may send the collected storage map cache data MCD_S to the host device 1050 regardless of conditions mentioned in operation S220.

According to at least one example embodiment of the inventive concepts, the collected storage map cache data MCD_S may be sent by using the data in UPIU described with reference to FIG. 7. For example, the collected storage map cache data MCD_S may be sent by using one or more data in UPIUs.

If the storage map cache data MCD_S is completely sent by using the data in UPIU, in operation S250, the host device 1050 may resend the map data request of the first mode to the storage device 1300. That is, operation S210 to operation S240 may be repeated while the host device 1050 and the storage device 1300 communicate with each other. For example, the map data request of the first mode may be a nameless request because a specific portion of the map data MD is not requested.

Figure 10:
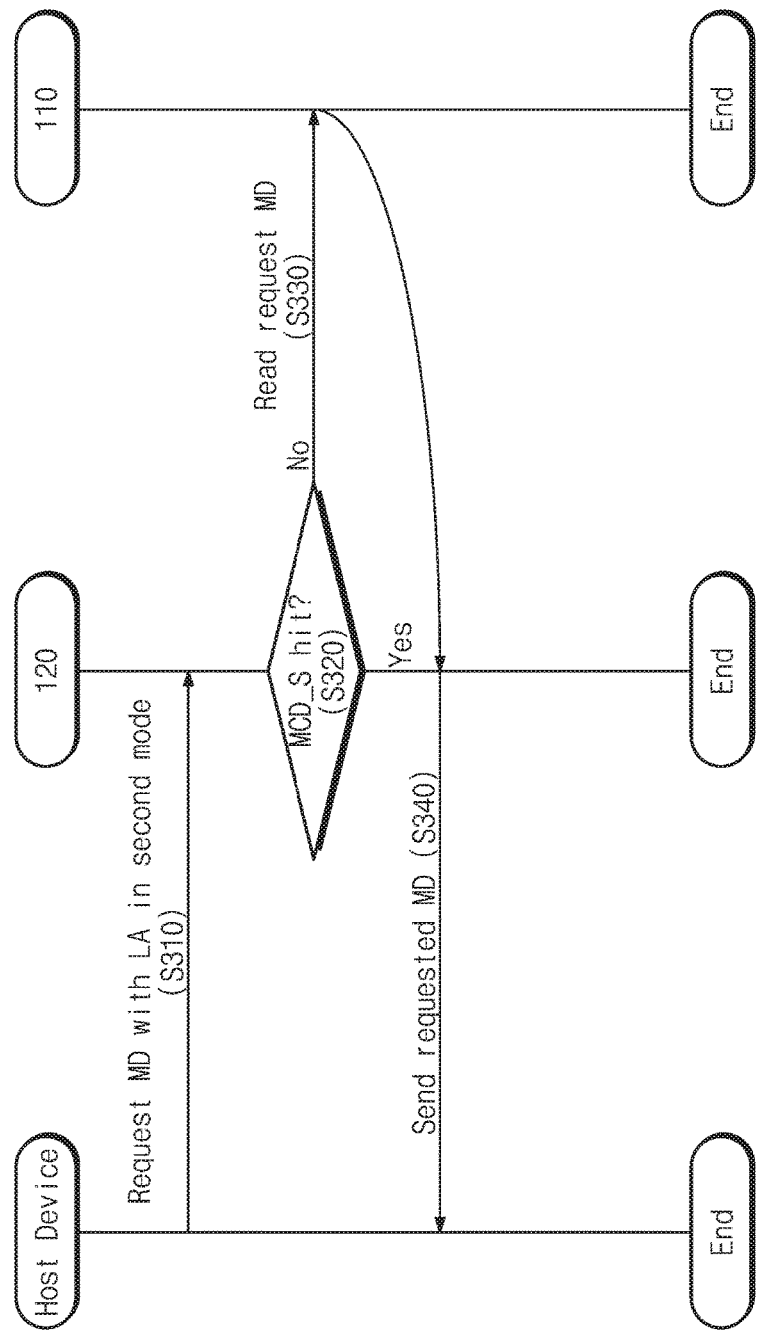
FIG. 10 is a flowchart illustrating a method in which the host device requests the map data from the storage device in a second mode.

FIG. 10 is a flowchart illustrating a method in which the host device 1050 requests the map data MD from the storage device 1300 in a second mode. Referring to FIGS. 1 and 10, in operation S310, the host device 1050 may request the map data MD from the controller 120 in the second mode. A map data request of the second mode may be provided together with logical addresses LA of a portion of the map data MD that the host device 1050 wants to receive. As another example, the map data request of the second mode may be provided together with an offset of a map data block of the map data MD that the host device 1050 wants to receive. According to at least one example embodiment of the inventive concepts, the second mode may be designated in the second option block OB2 of FIG. 5 or the third option block OB3 of FIG. 6.

In operation S320, the controller 120 may determine whether the portion of the map data MD requested by the host device 1050 is the same as the storage map cache data MCD_S (Hit). For example, the controller 120 may determine whether the portion of the map data MD requested by the host device 1050 is loaded on the controller 120 as the storage map cache data MCD_S. If the portion of the map data MD requested by the host device 1050 is the same as the storage map cache data MCD_S, operation S330 may be omitted, and the procedure proceeds to operation S340. If the portion of the map data MD requested by the host device 1050 is different from the storage map cache data MCD_S (Miss), operation S340 may be performed after operation S330 is performed.

In operation S330, the controller 120 may read the portion of the map data MD requested by the host device 1050 from the nonvolatile memory device 110 and store the read portion as the storage map cache data MCD_S. In operation S340, the controller 120 may provide the host device 1050 with the portion of the map data MD, which is requested by the host device 1050, of the storage map cache data MCD_S.

According to at least one example embodiment of the inventive concepts, the requested portion of the map data MD may be sent by using the data in UPIU described with reference to FIG. 7. For example, the requested portion of the map data MD may be sent by using one or more data in UPIUs. For example, the map data request of the second mode may be a named request because a specific portion of the map data MD is requested.

Figure 11:
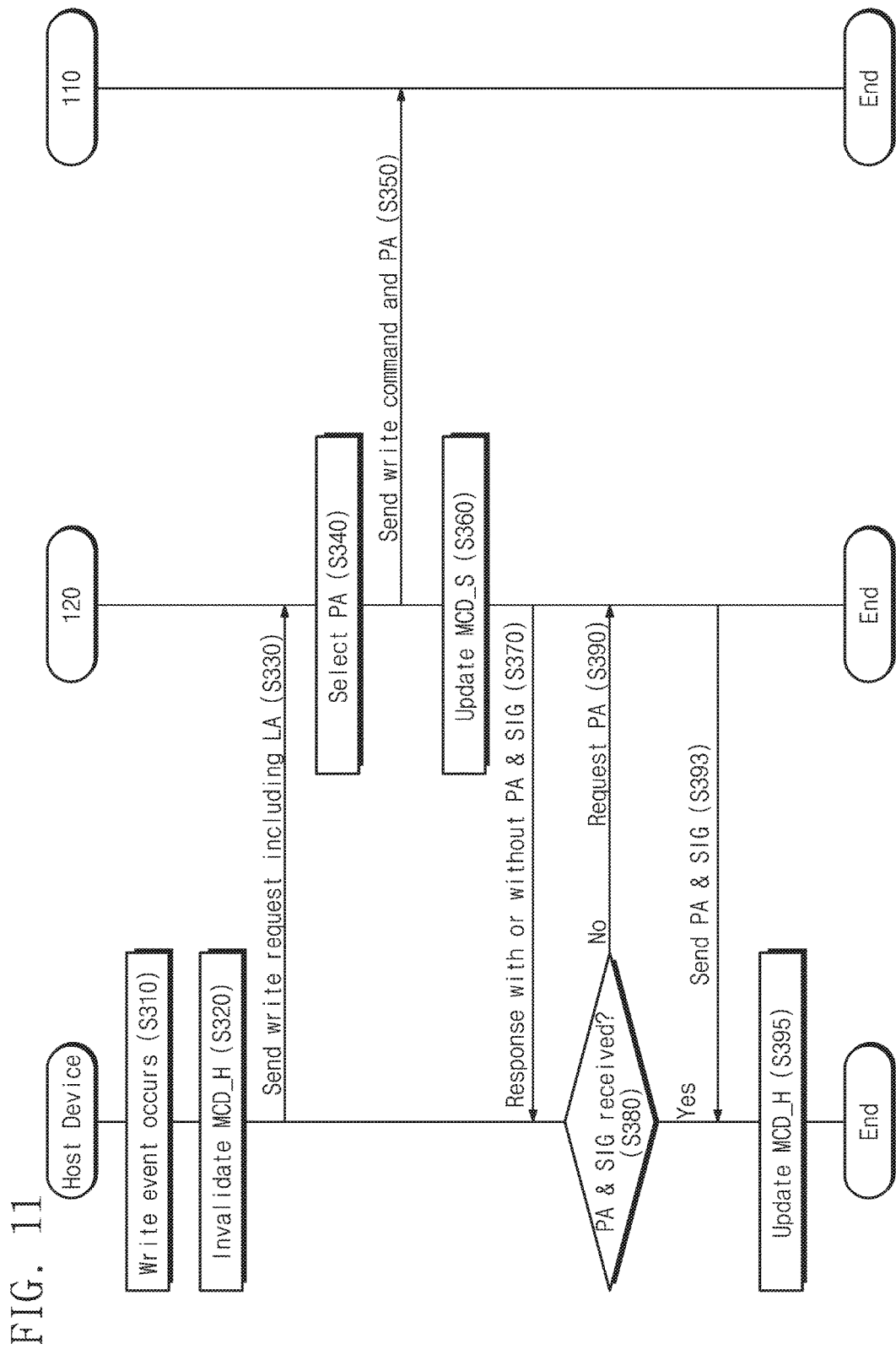
FIG. 11 is a flowchart illustrating a method in which the host device sends a write request to the storage device to perform a write operation.

FIG. 11 is a flowchart illustrating a method in which the host device 1050 sends a write request to the storage device 1300 to perform a write operation. Referring to FIGS. 1 and 11, in step S310, a write event may occur at the host device 1050. For example, data, which is to be written or updated at specific logical addresses LA of the storage device 1300, may be generated at the host device 1050.

When the write event occurs, in operation S320, the host device 1050 may invalidate a portion of the host map cache data MCD_H associated with the logical addresses LA of the write event. For example, the host device 1050 may release or delete a portion of the host map cache data MCD_H, which is associated with the logical addresses LA of the write event, from the RAM 1200.

In operation S330, the host device 1050 may send a write request including logical addresses LA to the controller 120. The write request may be provided by using the command UPIU described with reference to FIG. 4.

In response to the write request from the host device 1050, in operation S340, the controller 120 may select physical addresses PA of the nonvolatile memory device 110 at which data is to be written.

In operation S350, the controller 120 may perform a write operation requested by the host device 1050 by sending the selected physical addresses PA and a write command to the nonvolatile memory device 110.

In operation S360, the controller 120 may update the storage map cache data MCD_S based on a mapping relation between the selected physical addresses PA and the logical addresses LA included in the write request.

According to at least one example embodiment of the inventive concepts, operation S350 and operation S360 may be performed in the order illustrated in FIG. 11, reversely to the order illustrated in FIG. 11, or at the same time.

In step S370, the controller 120 may send a response to the host device 1050. For example, the response may be sent together with the signature SIG and physical addresses PA mapped to logical addresses LA included in the write request or without the physical addresses PA and the signature SIG. For example, in the case where the a range of consecutive logical addresses, for example, logical addresses LA included in the write request is mapped to a range of consecutive physical addresses, the controller 120 may send a response after including a start physical address of the range of the consecutive physical addresses and a signature SIG corresponding thereto in the response.

As another example, in the case where the a range of consecutive logical addresses, for example, logical addresses LA included in the write request is mapped to two or more ranges of consecutive physical addresses, the controller 120 may send a response after including start physical addresses of the two or more ranges of the consecutive physical addresses and signatures SIG corresponding thereto in the response. In the case where the capacity of the response is insufficient to send the two or more start physical addresses, the controller 120 may send the response without including the physical address PA and the signature SIG in the response.

If the physical address PA and the signature SIG are received in operation S380, operation S390 and operation S393 are omitted, and the procedure proceeds to operation S395. If the physical address PA and the signature SIG are not received in operation S380, operation S395 is performed after operation S390 and operation S393 are performed.

In operation S390, the host device 1050 may request the physical address PA from the controller 120. For example, the host device 1050 may request the physical address PA from the controller 120 through the map data request of the second mode described with reference to FIG. 10. The host device 1050 may send the map data request associated with the logical addresses LA in the write request to the controller 120.

In operation S393, the controller 120 may send start physical addresses of two or more ranges of consecutive physical addresses to the host device 1050 in response to the map data request.

In operation S395, the host device 1050 may update the host map cache data MCD_H based on the physical address PA and the signature SIG from the controller 120.

Figure 12:
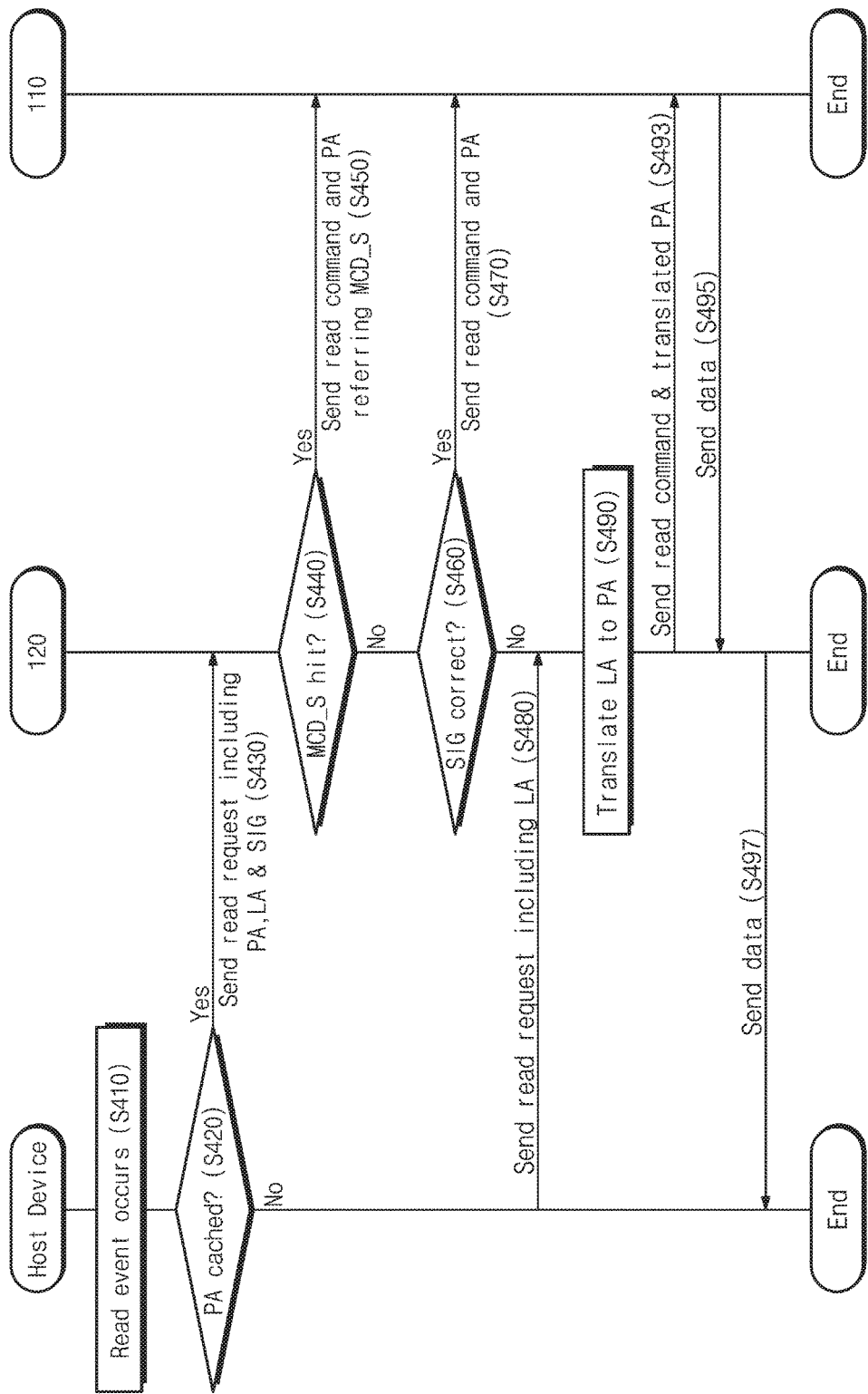
FIG. 12 is a flowchart illustrating a method in which the host device sends a read request to the storage device to perform a read operation.

FIG. 12 is a flowchart illustrating a method in which the host device 1050 sends a read request to the storage device 1300 to perform a read operation. Referring to FIGS. 1 and 12, in step S410, a read event may occur at the host device 1050. For example, a read event with respect to data, which is stored at specific logical addresses LA of the storage device 1300, may occur at the host device 1050.

If the read event occurs, in operation S420, the host device 1050 determines whether a portion of the map data MD associated with a logical address LA of the read event is loaded on the RAM 1200 as the host map cache data MCD_H. If the map data MD associated with the read event is loaded as the host map cache data MCD_H, in operation S430, the host device 1050 may obtain a physical address PA and a signature SIG associated with the logical address LA with reference to the host map cache data MCD_H and may send a read request including the physical address PA, the logical address LA, and the signature SIG to the controller 120. If the map data MD associated with the read event is not loaded as the host map cache data MCD_H, in operation S480, the host device 1050 may send the read request including the logical address LA to the controller 120.

According to at least one example embodiment of the inventive concepts, when the read event of the host device 1050 is associated with one range of consecutive physical addresses, the host device 1050 may send a start physical address of the range of the consecutive physical addresses and a signature SIG associated with the start physical address. When the read event of the host device 1050 is associated with two or more ranges of consecutive physical addresses, the host device 1050 may send start physical addresses of the two or more ranges of the consecutive physical addresses and signatures SIG associated with the start physical addresses. In the case where a size of the command UPIU or the command descriptor block CDB is insufficient to send two or more start physical addresses and two or more signatures, the host device 1050 may send a plurality of start physical addresses and a plurality of signatures SIG associated therewith by using two or more command UPIUs to the controller 120.

If the read request including the physical address PA, the logical address LA, and the signature SIG is received from the host device 1050 in operation S430, in operation S440, the controller 120 may determine whether a hit of the storage map cache data MCD_S is generated. For example, if a map data block associated with the physical address PA or the logical address LA included in the read request is loaded on the controller 120 as the storage map cache data MCD_S, it is determined that the hit of the storage map cache data MCD_S is generated. If the hit of the storage map cache data MCD_S is generated, in operation S450, the controller 120 may obtain the physical address PA with reference to the storage map cache data MCD_S and may perform the read request by sending the obtained physical address PA and the read command to the nonvolatile memory device 110.

If it is determined, in operation S440, that a miss of the storage map cache data MCD_S is generated, in operation S460, the controller 120 determines whether the signature SIG is correct. For example, the controller 120 may generate a signature based on the physical and logical addresses PA and LA included in the read request and compare the generated signature with the signature SIG included in the read request. If the generated signature is the same as the signature SIG included in the read request, it is determined that the physical address PA included in the read request is a correct address that is not hacked. In operation S470, the controller 120 may process the read request by sending the selected the physical address PA included in the read request and a read command to the nonvolatile memory device 110.

If the read request including the logical address LA is received in operation S480 or if it is, in operation S460, determined that the signature SIG included in the read request is not correct, in operation S490, the controller 120 may translate the logical address LA included in the read request into the physical address PA. For example, if a map data block associated with the logical address LA included in the read request is loaded as the storage map cache data MCD_S, the controller 120 may translate the logical address LA into the physical address PA immediately with reference to the storage map cache data MCD_S. If a map data block associated with the logical address LA included in the read request is not loaded as the storage map cache data MCD_S, the controller 120 may read a map data block corresponding to the logical address LA from the nonvolatile memory device 110, store the read map data block as the storage map cache data MCD_S, and translate the logical address LA into the physical address PA with reference to the storage map cache data MCD_S. In operation S493, the controller 120 may process the read request by sending the translated physical address PA and a read command to the nonvolatile memory device 110.

In operation S495, the nonvolatile memory device 110 may output data to the controller 120 in response to the read command received in operation S450, the read command received in operation S470, or the read command received in operation S495.

In step S497, the controller 120 may store the data from the nonvolatile memory device 110 to the host device 1050.

FIG. 13 shows an example of the command descriptor block CDB of the read request that is used for the host device 1050 to request a read operation from the storage device 1300. According to at least one example embodiment of the inventive concepts, an example of the command descriptor block CDB of the read request of the first mode including only a logical address LA without a physical address PA is illustrated in FIG. 13. According to at least one example embodiment of the inventive concepts, the read request of the first mode will be described with reference to the command descriptor block CDB of a read (10) command of the UFS. However, the read request of the first mode, which the host device 1050 sends to the storage device 1300, is not limited to the command descriptor block CDB of the read (10) command of the UFS. The read request of the first mode may be appropriately selected according to a type of an interface between the host device 1050 and the storage device 1300.

Referring to FIGS. 1, 4, and 13, rows of the command descriptor block CDB indicate bytes thereof, respectively. According to at least one example embodiment of the inventive concepts, the command descriptor block CDB of the read (10) command may include 0th to 9th bytes. Columns of the command descriptor block CDB indicate bits of each byte thereof, respectively. For example, each byte may include 0th to 7th bits.

The 0th to 7th bits of the 0th byte in the command descriptor block CDB indicate an operation code. For example, the operation code of the read (10) command may be "28h".

The 1st bit of the 1st byte in the command descriptor block CDB of the read (10) command may not be used. The 1st bit of the 1st byte may indicate FUA_NV. The 2nd bit of the 1st byte may be reserved. The 3rd bit of the 1st byte may indicate FUA (Force Unit Access). The FUA may indicate whether a data cache is used. The 4th bit of the 1st byte indicates a disable page out (DPO). The DPO may indicate how to set a retention priority. The 5th to 7th bits of the 1st byte is RDPROTECT and may have a value of "000b".

2nd to 5th bytes of the command descriptor block CDB of the read (10) command indicate a logical address LA. The logical address LA may include an MSB to an LSB.

The 0th to 4th bits of the 6th byte in the command descriptor block CDB of the read (10) command indicate a group number. The group number may indicate a context ID associated with a read request. The 5th to 7th bits of the 6th byte are reserved.

The 7th and 8th bytes of the command descriptor block CDB of the read (10) command indicate a transfer length. The transfer length indicates a length of data to be read through a read request.

The 9th byte of the command descriptor block CDB of the read (10) command may include "CONTROL". For example, the CONTROL may be "00h".

FIG. 14 shows another example of the command descriptor block CDB of the read request that is used for the host device 1050 to request a read operation from the storage device 1300. According to at least one example embodiment of the inventive concepts, an example of the command descriptor block CDB of the read request of the second mode, which the host device 1050 sends while only including a physical address PA and a logical address LA, is illustrated in FIG. 14. According to at least one example embodiment of the inventive concepts, the read request of the second mode will be described with reference to the command descriptor block CDB of a read (16) command of the UFS. However, the read request of the second mode, which the host device 1050 sends to the storage device 1300, is not limited to the command descriptor block CDB of the read (16) command of the UFS. The read request of the second mode may be appropriately selected according to a type of an interface between the host device 1050 and the storage device 1300.

Referring to FIGS. 1, 4, and 14, rows of the command descriptor block CDB indicate bytes thereof, respectively. According to at least one example embodiment of the inventive concepts, the command descriptor block CDB of the read (16) command may include 0th to 15th bytes. Columns of the command descriptor block CDB indicate bits of each byte thereof, respectively. For example, each byte may include 0th to 7th bits.

The 0th to 7th bits of the 0th byte in the command descriptor block CDB indicate an operation code. For example, the operation code of the read (16) command may be "88h".

The 1st bit of the 1st byte in the command descriptor block CDB of the read (16) command may not be used. The 1st bit of the 1st byte may indicate FUA_NV. The 2nd bit of the 1st byte may be reserved. The 3rd bit of the 1st byte may indicate FUA. The FUA may indicate whether a data cache is used. The 4th bit of the 1st byte indicates a DPO. The DPO may indicate how to set a retention priority. The 5th to 7th bits of the 1st byte are RDPROTECT and may have a value of "000b".

The 2nd to 5th bytes of the command descriptor block CDB of the read (16) command indicate a fourth option block OB4. The fourth option block OB4 may include an MSB to an LSB. The fourth option block OB4 may include a logical address LA and a physical address PA.

The 10th to 13rd bytes of the command descriptor block CDB of the read (16) command indicate a transfer length. The transfer length indicates a length of data to be read through a read request.

The 0th to 4th bits of the 14th byte in the command descriptor block CDB of the read (16) command indicate a group number. The group number may indicate a context ID associated with a read request. The 5th and 6th bits of the 14th byte are reserved. The 7th bit of the 14th byte may be ignored.

The 15th byte of the command descriptor block CDB of the read (16) command may include "CONTROL". For example, the CONTROL may be "00h".

FIG. 15 shows an example of the command descriptor block CDB that is used for the host device 1050 sends a plurality of physical addresses PA and signatures SIG by using a separate command UPIU. According to at least one example embodiment of the inventive concepts, the physical addresses and the signatures SIG will be described with reference to the command descriptor block CDB of a mode select command of the UFS. However, that the host device 1050 sends the physical addresses PA and the signatures SIG to the storage device 1300 is not limited to the command descriptor block CDB of the mode select command of the UFS. The sending of the physical addresses PA and the signatures SIG may be appropriately selected according to a type of an interface between the host device 1050 and the storage device 1300.

Referring to FIGS. 1, 4, and 15, rows of the command descriptor block CDB indicate bytes thereof, respectively. According to at least one example embodiment of the inventive concepts, the command descriptor block CDB of the read (16) command may include 0th to 9th bytes. Columns of the command descriptor block CDB indicate bits of each byte thereof, respectively. For example, each byte may include 0th to 7th bits.

The 0th byte of the command descriptor block CDB indicates an operation code. In the mode select command, the operation code may be "55h".

The 0th bit of the 1st byte 1 in the command descriptor block CDB of the mode select command indicate save pages (SP). The 1st to 3rd bits of the 1st byte are a fifth option block OB5. The 4th bit of the 1st byte may indicate a page format (PF) and may be "1b". The 5th to 7th bits of the 1st byte are the fifth option block OB5.

The 2nd to 6th bytes of the command descriptor block CDB of the mode select command are the fifth option block OB5.

The 7th and 8th bytes in the command descriptor block CDB of the mode select command may indicate a parameter list length.

The 9th byte of the command descriptor block CDB of the mode select command may include "CONTROL". For example, the CONTROL may be "00h".

In the case where the mode select command is used for a purpose other than the sending of the physical addresses PA and the signatures SIG, the fifth option block OB5 may include a reserved block. In the case where the mode select command is used to send the physical addresses PA and the signatures SIG, the fifth option block OB5 may include an argument or description informing that the physical addresses PA and the signatures PA are sent and include a reserved block.

The controller 120 may send a "ready to transfer UPIU" to the host device 1050 in response to a mode select command. In response to the "ready to transfer UPIU", the host device 1050 may send a data out UPIU including the physical addresses PA and the signatures SIG to the controller 120.

According to at least one example embodiment of the inventive concepts, the host device 1050 may combine the read (10) or read (16) command described with reference to FIG. 13 or 14 with the mode select command of FIG. 15 and may send the combined result to the controller 120.

Figure 16:
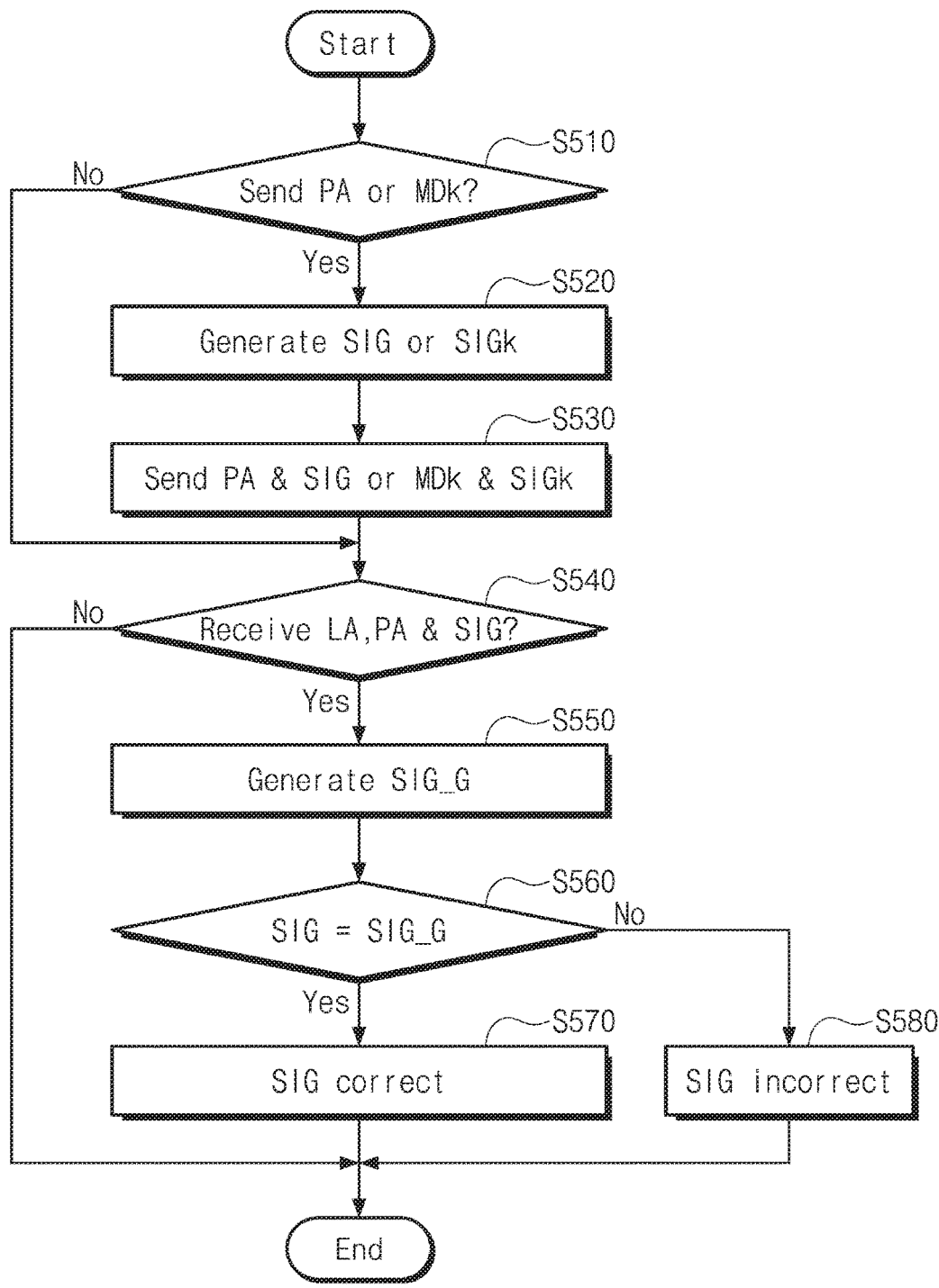
FIG. 16 is a flowchart illustrating a method, in which the controller manages the signature, according to at least some example embodiments of the inventive concepts.

FIG. 16 is a flowchart illustrating a method in which the controller 120 manages the signature SIG. Referring to FIGS. 1 and 16, in operation S510, the controller 120 determines whether to send a physical address PA or a map data block MDK to the host device 1050. In the case where the physical address PA or the map data block MDK is not sent to the host device 1050, operation S520 and operation S530 are omitted. In the case of sending the physical address PA or the map data block MDK to the host device 1050, operation S520 and operation S530 are performed.

In operation S520, the controller 120 may generate the signature SIG based on the physical address PA and a logical address LA corresponding to the physical address PA. Alternatively, the controller 120 may generate a signature block SIGK corresponding to the map data block MDK based on physical and logical addresses PA and LA of each entry of the map data block MDK.

In operation S530, the controller 120 may send the physical address PA and the signature SIG corresponding to the physical address PA or the map data block MDK and the signature block SIGK corresponding to the map data block MDK to the host device 1050.

In operation S540, the controller 120 determines whether a logical address LA, a physical address PA, and a signature SIG are received from the host device 1050. If it is determined that the logical address LA, the physical address PA, and the signature SIG are not received from the host device 1050, operation S550 to operation S570 are omitted. If it is determined that the logical address LA, the physical address PA, and the signature SIG are received from the host device 1050, operation S550 to operation S570 are performed.

In operation S550, the controller 120 may generate a signature SIG_G based on the received physical and logical addresses PA and LA. In operation S560, the controller 120 determines whether the received signature SIG is the same as the generated signature SIG_G. If the received signature SIG is the same as the generated signature SIG_G, in operation S570, the controller 120 determines whether the received signature SIG is correct. If the received signature SIG is different from the generated signature SIG_G, in operation S580, the controller 120 determines that the received signature SIG is incorrect and the host map cache data MCD_H is hacked or is lost. The controller 120 may notify the host device 1050 that the signature SIG is incorrect.

Figure 17:
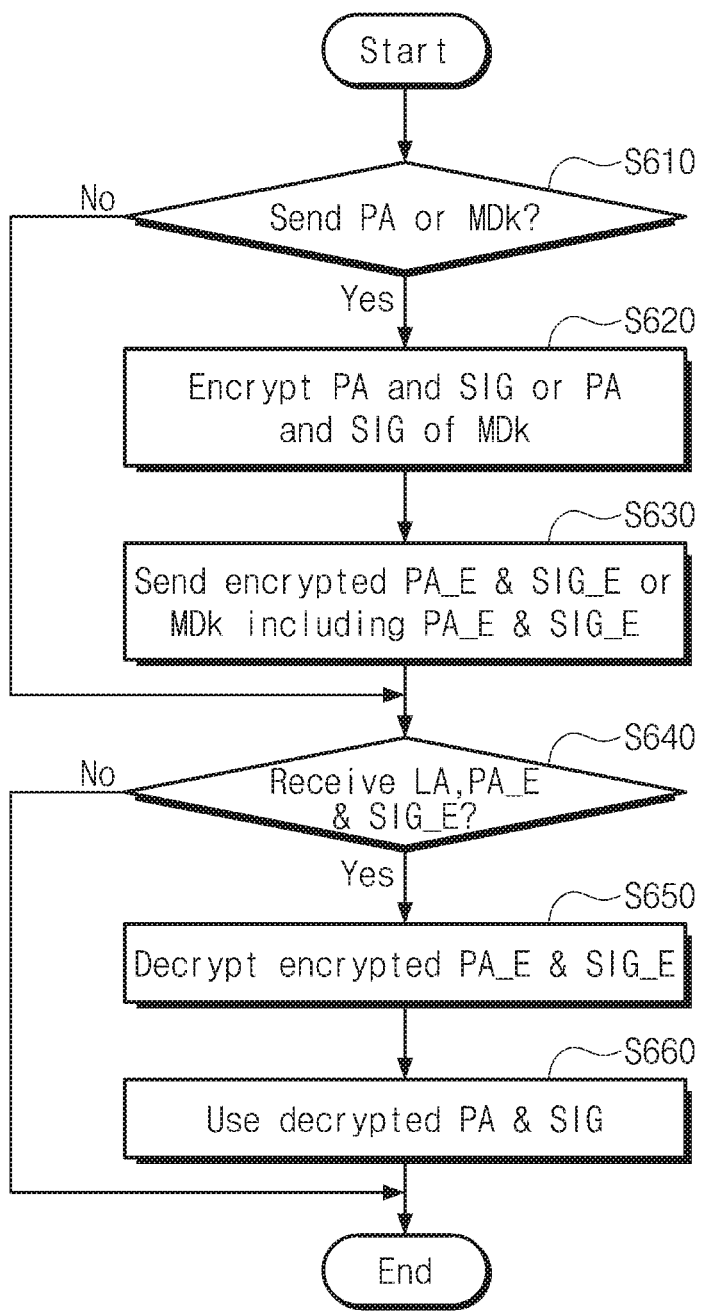
FIG. 17 is a flowchart illustrating an example in which the controller performs encryption when sending the map data to the host device.

FIG. 17 is a flowchart illustrating an example in which the controller 120 performs encryption when sending the map data MD to the host device 1050. Referring to FIGS. 1 and 17, in operation S610, the controller 120 determines whether to send a physical address PA or a map data block MDK to the host device 1050. In the case where the physical address PA or the map data block MDK is not sent to the host device 1050, operation S620 and operation S630 are omitted. In the case of sending the physical address PA or the map data block MDK to the host device 1050, operation S620 and operation S630 are performed.

In operation S620, the controller 120 may encrypt the physical address PA and a signature SIG or encrypt physical addresses PA and signatures SIG of the map data block MDK. In operation S630, the controller 120 may send the encrypted physical address PA_E and the encrypted signature SIG_E or the map data block MDK including the encrypted physical address PA_E and the encrypted signature SIG_E to the host device 1050.

In operation S640, the controller 120 determines whether a logical address LA, the encrypted physical address PA_E, and the encrypted signature SIG_E are received from the host device 1050. If it is determined that the logical address LA, the encrypted physical address PA_E, and the encrypted signature SIG_E are not received from the host device 1050, operation S650 to operation S660 are omitted. If it is determined that the logical address LA, the encrypted physical address PA_E, and the encrypted signature SIG_E are received from the host device 1050, operation S650 to operation S660 are performed.

In operation S650, the controller 120 decrypt the encrypted physical address PA_E and the encrypted signature SIG_E. In operation S660, the controller 120 may use the decrypted physical address PA and the decrypted signature SIG. For example, as described with reference to FIG. 16, the controller 120 may determine whether the decrypted signature SIG is correct, by using the decrypted signature SIG. If the decrypted signature SIG is correct, as described with reference to FIG. 12, the controller 120 may send the decrypted physical address PA and a read command to the nonvolatile memory device 110.

As described above, if a portion of the map data MD loaded as host map cache data MCD_H on the RAM 1200 of the host device 1050 is encrypted, the security level of the map data MD and the storage device 1300 may be improved.

Figure 18:
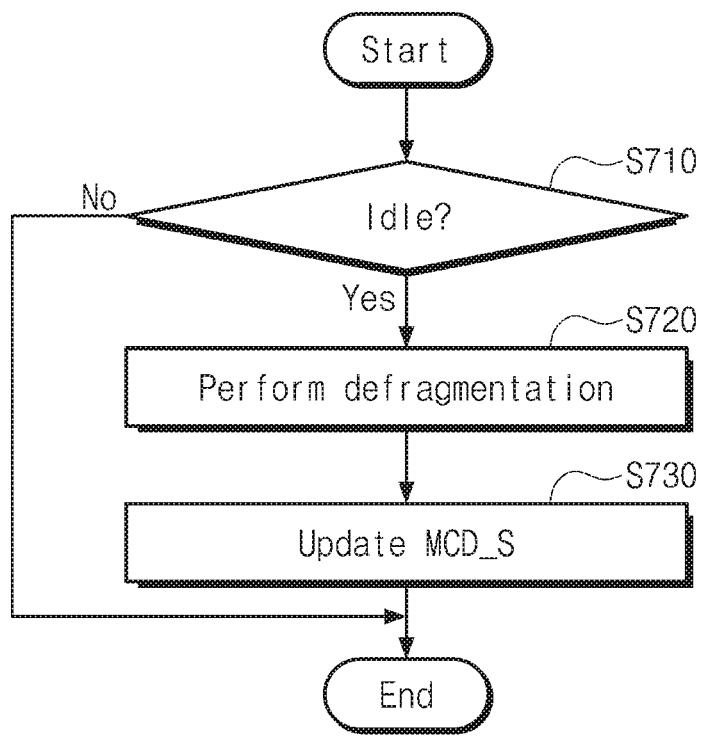
FIG. 18 is a flowchart illustrating an example in which the storage device performs defragmentation.

FIG. 18 is a flowchart illustrating an example in which the storage device 1300 performs defragmentation. Referring to FIGS. 1 and 18, in operation S710, the controller 120 may determine whether it remains at an idle state. For example, in the case where a request, which is pending after being issued from the host device 1050, is absent (i.e., in a case where no pending host requests remain), the controller 120 may determine that it remains at an idle state.

If the idle state is determined, in operation S720, the controller 120 performs defragmentation. The defragmentation includes migrating pieces of data belonging to a range of consecutive logical addresses and to two or more ranges of consecutive physical addresses, such that data belonging to a range of consecutive logical addresses belongs to a range of consecutive physical addresses. In operation S730, the controller 120 may update storage map cache data MCD_S based on the defragmentation result.

If the defragmentation is performed as described above, the number of events that the host device 1050 provides the controller 120 with a plurality of physical addresses together with a read request is reduced. Accordingly, the operating speeds of the storage device 1300 and the computing device 1000 may be improved.

Figure 19:
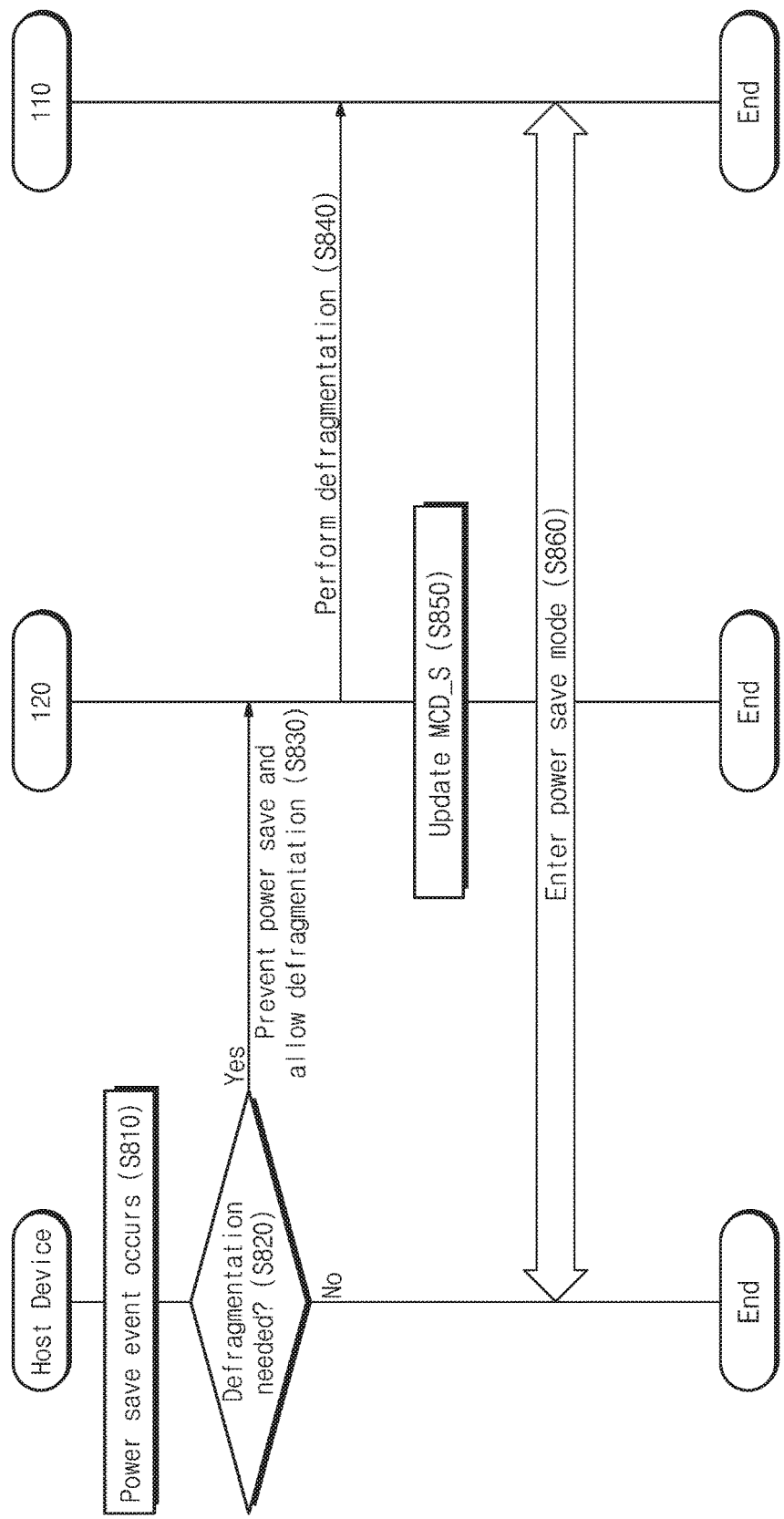
FIG. 19 is a flowchart illustrating an example in which a computing device supports defragmentation of the storage device.

FIG. 19 is a flowchart illustrating an example in which the computing device 1000 supports defragmentation of the storage device 1300. Referring to FIGS. 1 and 19, in step S810, a power save event may occur at the host device 1050. The power save event indicates that a condition, in which the host device 1050 enters the power save mode, is satisfied.

If the power save event occurs, in operation S820, the host device 1050 determines whether the defragmentation is necessary for the storage device 1300. For example, the host device 1050 may determine whether the defragmentation is necessary for the storage device 1300, through device information of a response UPIU from the storage device 1300 or a separate report from the storage device 1300.

If the defragmentation is necessary for the storage device 1300 upon occurrence of the power save event, in operation S830, the host device 1050 prohibits the power save mode and permits the storage device 1300 to perform the defragmentation. In step S840, the controller 120 may access the nonvolatile memory device 110 to perform the defragmentation. In operation S850, the controller 120 may update storage map cache data MCD_S based on the defragmentation result.

If the defragmentation is completed or if the defragmentation is unnecessary, in operation S860, the host device 1050, the controller 120, and the nonvolatile memory device 110 may enter the power save mode.

Figure 20:
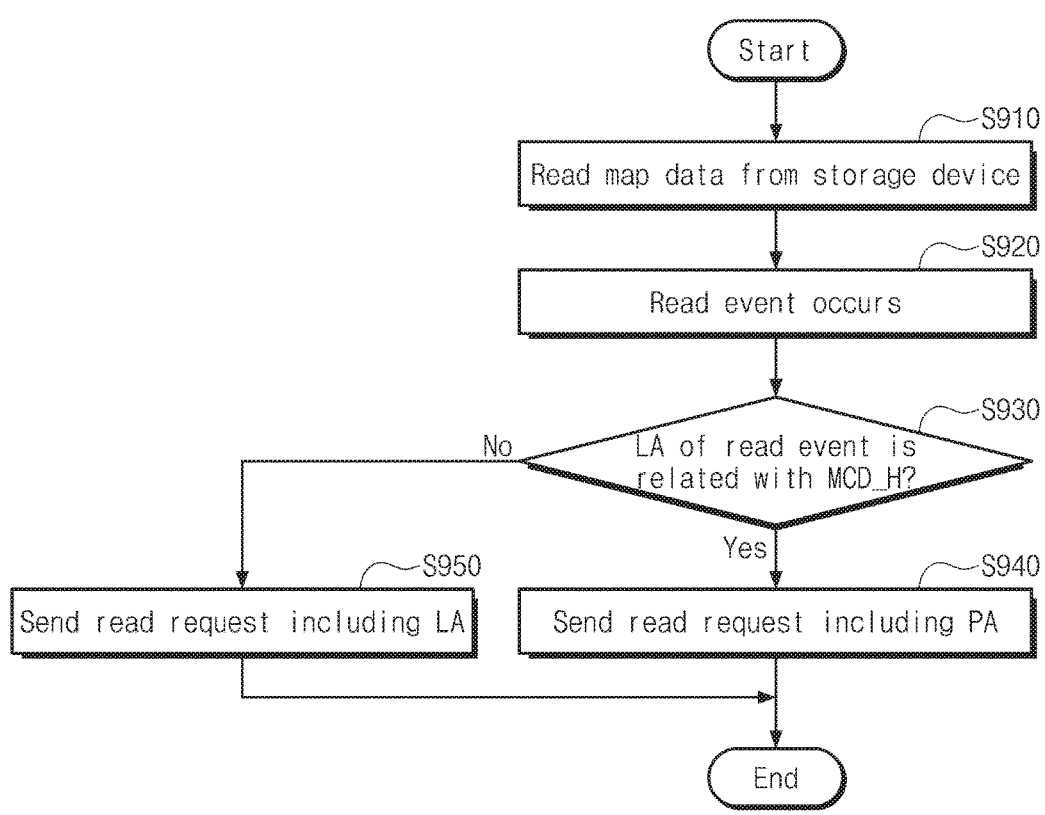
FIG. 20 is a flowchart illustrating a method in which the host device accesses the storage device.

FIG. 20 is a flowchart illustrating a method in which the host device 1050 accesses the storage device 1300. Referring to FIG. 20, in operation S910, the host device 1050 may read map data from the storage device 1300. The map data may be stored as host map cache data MCD_H in the RAM 1200.

In step S920, a read event may occur at the host device 1050.

In operation S930, the host device 1050 may determine whether a logical address LA of the read event is associated with the host map cache data MCD_H stored in the RAM 1200. For example, the host device 1050 may determine whether a portion of the map data MD associated with the logical address LA of the read event is loaded as the host map cache data MCD_H on the RAM 1200.

If the logical address LA is associated with the host map cache data MCD_H, in operation S940, the host device 1050 may obtain a physical address PA associated with the logical address LA of the read event with reference to the host map cache data MCD_H and may send a read request including the physical address PA to the storage device 1300.

If the logical address LA is not associated with the host map cache data MCD_H, in operation S950, the host device 1050 may send a read request including the logical address LA of the read event to the storage device 1300.

The storage device 1300 may include a solid state drive (SSD) or a hard disk drive (HDD). The storage device 1300 may include memory cards, such as PC card (personal computer memory card international association (PCM-CIA)), compact flash (CF) card, smart media card (e.g., SM, SMC), memory stick, multimedia card (e.g., MMC, RS-MMC, MMCmicro), SD card (e.g., SD, miniSD, microSD, SDHC), universal serial bus (USB) memory card, and universal flash storage (UFS). The storage device 1300 may include embedded memories, such as an embedded Multi-Media card (eMMC), the UFS, and PPN (Perfect Page NAND).

Figure 21:
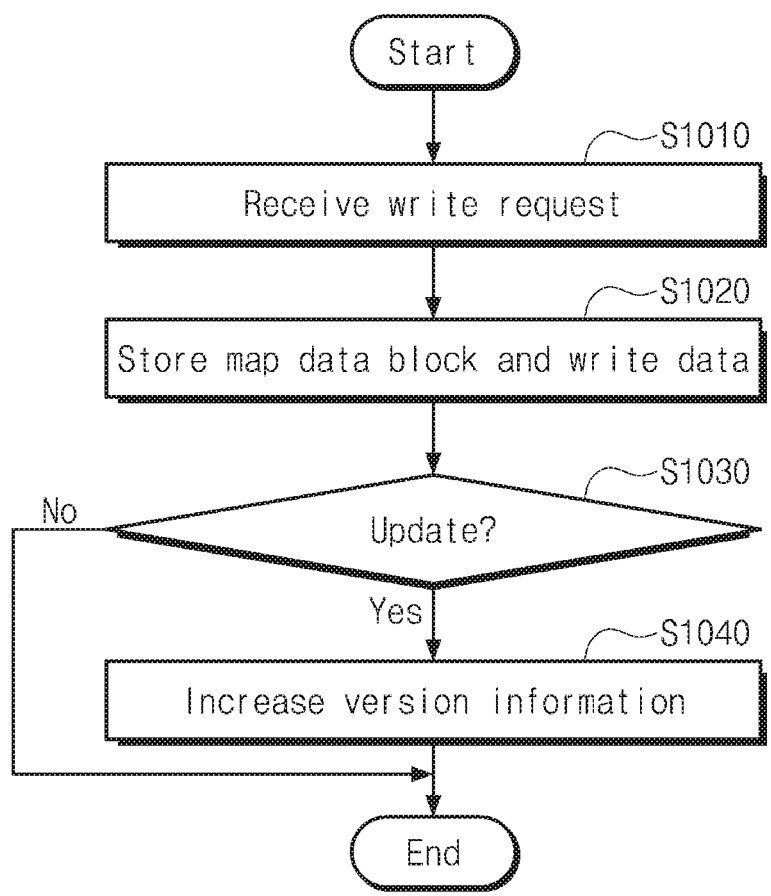
FIG. 21 shows an example of assigning version information to storage map cache data and host map cache data.

FIG. 21 shows an example of assigning version information to storage map cache data MCD_S and host map cache data MCD_H. Referring to FIGS. 1 and 21, in operation S1010, the controller 120 may receive a write request from a host device.

In operation S1020, the controller 120 may generate a map data block in response to the write request and may write the map data block as a portion of the storage map cache data MCD_S. Also, the controller 120 may write write-requested data in the nonvolatile memory device 110 based on the generated map data block. For example, the controller 120 may map a logical address corresponding to the write request on a physical address of a free storage space of the nonvolatile memory device 110. The controller 120 may add the mapping information to the storage map cache data MCD_S as the map data block or may update the storage map cache data MCD_S with the mapping information. The controller 120 may write the write-requested data in a free storage space of the mapped physical address.

In operation S1030, the controller 120 may determine whether the map data block is updated. For example, when a map data block of a logical address corresponding to the write request is previously stored in the controller 120 or the nonvolatile memory device 110 and the previously stored map data block is changed according to the write request, the controller 120 may determine that the map data block is updated. When a map data block of a logical address corresponding to the write request is not previously stored in the controller 120 or the nonvolatile memory device 110 and a map data block corresponding to the write request is newly generated, the controller 120 may determine that the map data block is not updated. That is, when a write request is a request for updating data previously written in the nonvolatile memory device 110 or when the write request is an update request for a logical address at which data is previously stored, the controller 120 may determine that a map data block is updated. When a write request is a new write request associated with the nonvolatile memory device 110 or when the write request is a write request for a logical address at which data is not previously stored, the controller 120 may determine that a map data block is not updated.

If it is determined that the map data block is updated, in operation S1040, the controller 120 increases version information of the updated map data block. For example, when a map data block is stored in the controller 120, the controller 120 may increase the version information. When a map data block is stored in the nonvolatile memory device 110, the controller 120 may read the map data block from the nonvolatile memory device 110 and may increase version information of the read map data block. If it is determined that the map data block is not updated, the controller 120 maintains the version information of the map data block without change.

Figure 22:
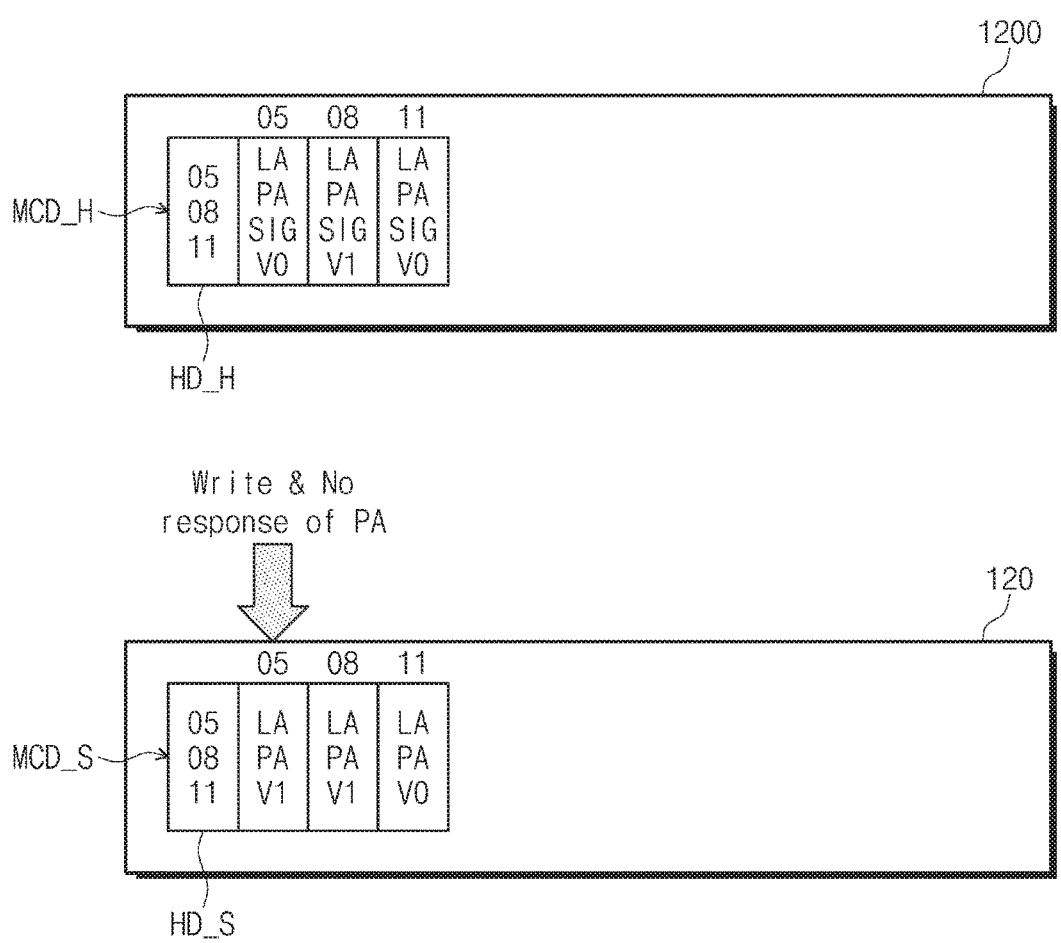
FIG. 22 shows an example in which version information is added to storage map cache data and host map cache data.

FIG. 22 shows an example in which version information is added to the storage map cache data MCD_S and the host map cache data MCD_H. Referring to FIGS. 1 and 22, version information may be added to each map data block of the storage map cache data MCD_S and each map data block of the host map cache data MCD_H. For example, pieces of version information of map data blocks that respectively correspond to offsets "05", "08", and "11" of the host map cache data MCD_H may be V0, V1, and V0. Version information may be added to each map data block of the storage map cache data MCD_S. For example, pieces of version information of map data blocks that respectively correspond to offsets "05", "08", and "11" of the storage map cache data MCD_S may be V1, V1, and V0.

As described with reference to FIG. 21, version information increases when the storage map cache data MCD_S is updated. That is, when a map data block corresponding to the offset "05" is updated (e.g., a write operation for updating a physical address PA mapped on a logical address LA is performed) and the result of updating the physical address PA, that is, the updated map data block is not provided as a response to the host map cache data MCD_H, the version information V1 of a map data block corresponding to the offset "05" of the storage map cache data MCD_S is larger than the version information V0 of a map data block associated with the corresponding offset "05" of the host map cache data MCD_H. On the basis of the version information, the controller 120 may determine whether a physical address PA received from the host device is the latest or a physical address PA stored as the storage map cache data MCD_S is the latest.

Figure 23:
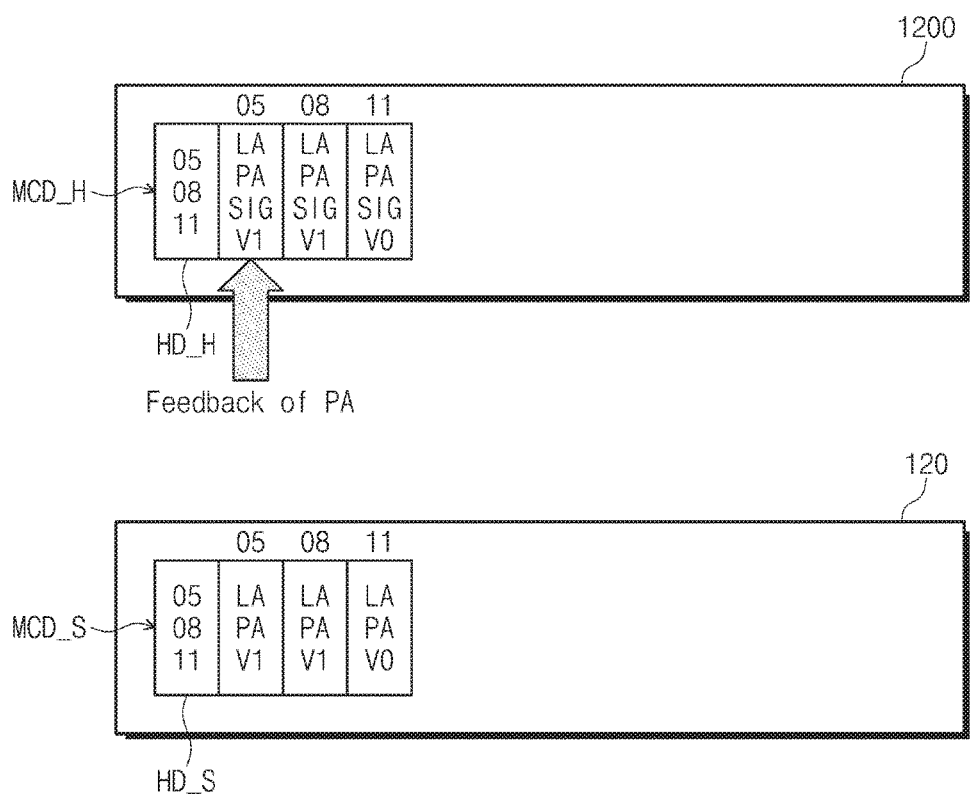
FIG. 23 shows an example in which storage map cache data is fed back to host map cache data.

FIG. 23 shows an example in which the storage map cache data MCD_S is fed back to the host map cache data MCD_H. Referring to FIGS. 1 and 23, when the storage map cache data MCD_S is fed back to the host map cache data MCD_H, the physical address PA and the version information V1 of a map data block corresponding to the offset "05" of the host map cache data MCD_H become the same as the physical address PA and the version information V1 of a map data block corresponding to the offset "05" of the storage map cache data MCD_S.

Figure 24:
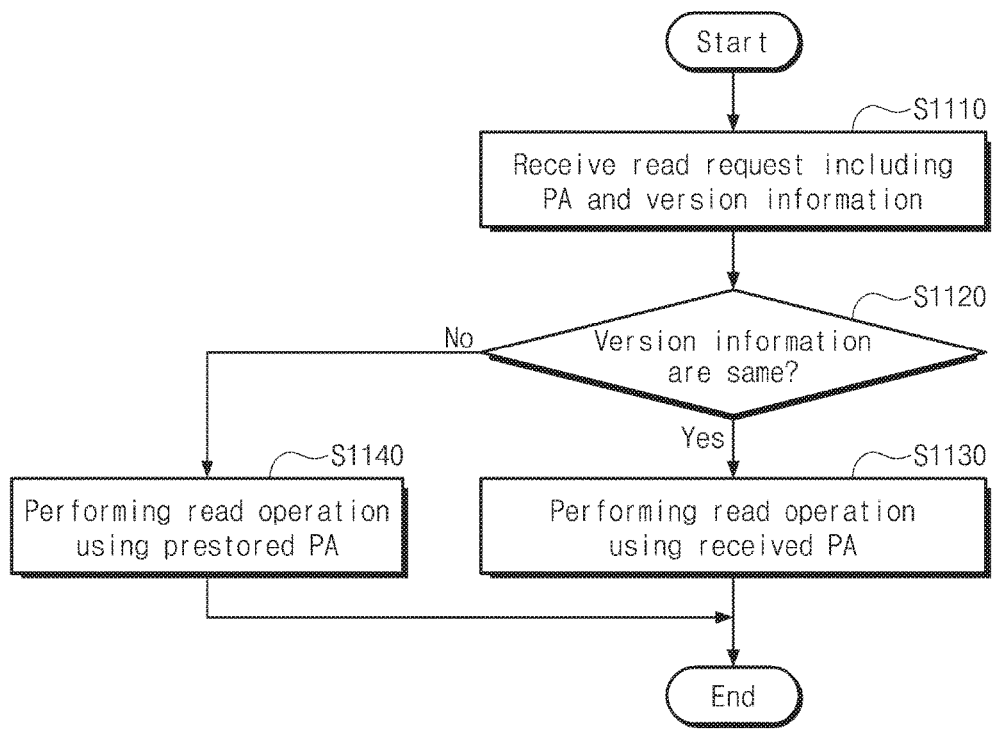
FIG. 24 illustrates an example of a method of performing a read operation by using version information.

FIG. 24 illustrates an example of a method of performing a read operation by using version information. Referring to FIGS. 1 and 24, in operation S1110, the controller 120 may receive a read request that includes a physical address PA and version information.

In operation S1120, the controller 120 determines whether the received version information is the same as version information of a map data block of the storage map cache data MCD_S, which corresponds to the write request. If the pieces of version information are the same, the physical address PA received from a host is the latest. In this case, in operation S1130, the controller 120 may perform a read operation by using the received physical address PA. If the pieces of version information are different, the physical address PA received from a host is not the latest. In this case, in operation S1140, the controller 120 may perform a read operation by using a physical address PA stored as the storage map cache data MCD_S. For example, the controller 120 may convert a logical address received together with the read request into a physical address PA by using the storage map cache data MCD_S and may perform the read operation by using the converted physical address PA.

According to the above-described embodiment, the controller 120 determines whether a physical address that a host device sends is the latest, based on version information; only when the physical address is the latest, a read operation is performed by using the latest physical address. Accordingly, it may be possible to prevent a read operation from being performed on an abnormal physical address PA.

In the above-described embodiment, it is assumed that the size of a map data block to which an offset is assigned is the same as a size of a unit that is used to assign version information. However, the size of a map data block to which an offset is assigned may be set to be different from a size of a unit that is used to assign version information.

According to at least one example embodiment of the inventive concepts, lengths of pieces of version information respectively assigned to map data blocks may be set to be the same as or different from each other. For example, pieces of version information initially assigned to map data blocks may be set to have the same length. When the number of times that a specific map data block is updated is larger than the numbers of times that other map data blocks are updated, a length of version information of the specific map data block may increase, and lengths of pieces of version information of the other map data blocks may decrease.

According to at least one example embodiment of the inventive concepts, when version information received from the host device has the maximum value expressible by a length thereof or has a preset or, alternatively, desired overflow value, the controller 120 may ignore a physical address received from the host device and may use a physical address of the storage map cache data MCD_S.

Figure 25:
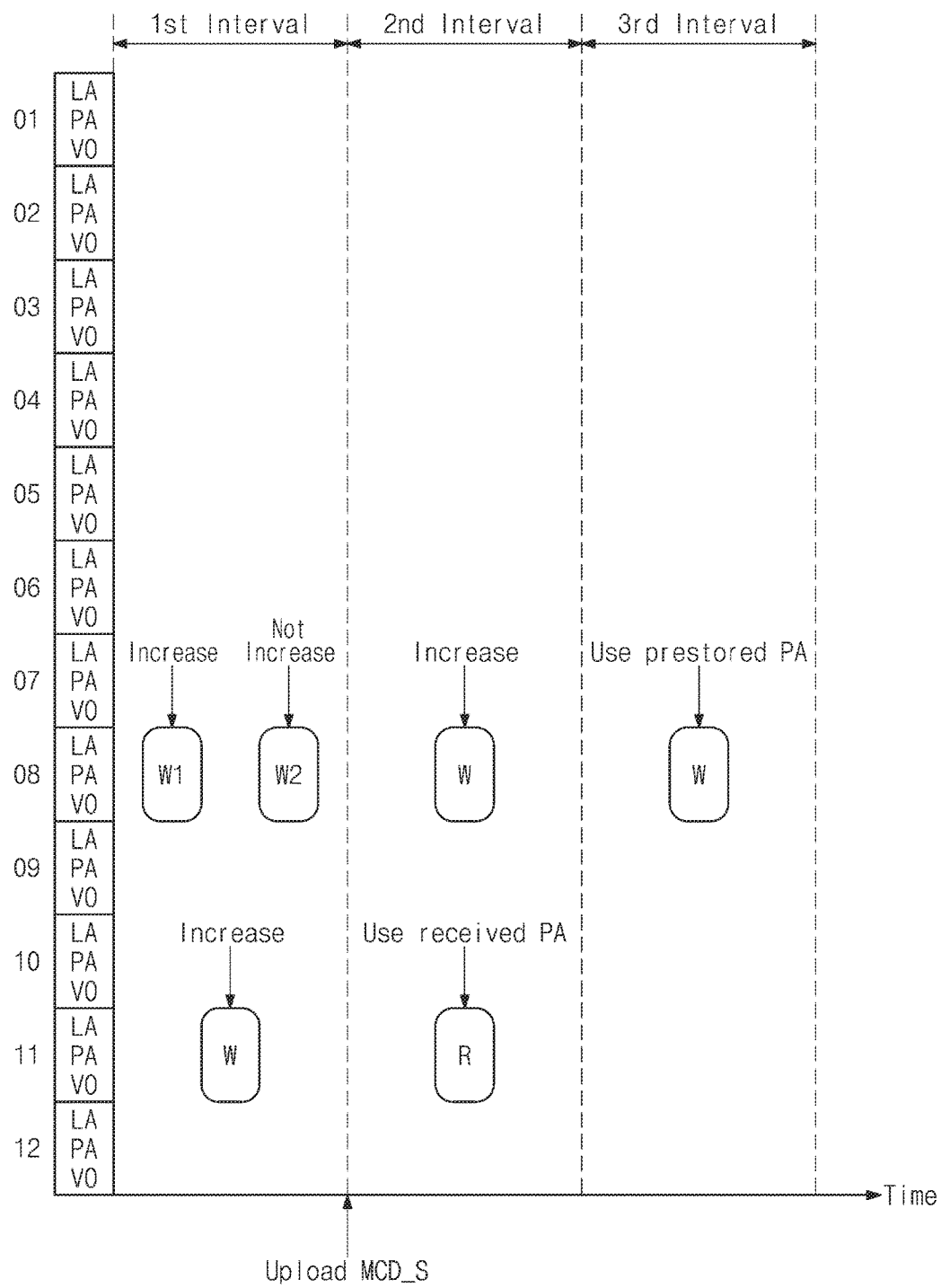
FIG. 25 shows an example in which version information increases according to a time interval.

FIG. 25 shows an example in which version information increases according to a time interval. In FIG. 25, the abscissa represents a time, and the ordinate shows map data blocks loaded on the controller 120 as the storage map cache data MCD_S. According to at least one example embodiment of the inventive concepts, it assumed that pieces of version information of map data blocks respectively corresponding to offsets "01" to "12" are V0.

Referring to FIGS. 1 and 25, the controller 120 may once increase version information of a map data block in which one or more update operations are performed during a specific time interval.

Referring to a first interval, a first write operation W1 and a second write operation W2 may be performed on a logical address LA of a map data block corresponding to the offset "08". The first write operation W1 may accompany operations of writing data in the nonvolatile memory device 110 and updating all or part of the map data block corresponding to the offset "08" of the storage map cache data MCD_S. Version information of the offset "08" may increase when the map data block of the offset "08" is updated. The second write operation W2 may accompany operations of writing data in the nonvolatile memory device 110 and updating all or part of the map data block corresponding to the offset "08" of the storage map cache data MCD_S. However, since the version information of the map data block corresponding to the offset "08" already increases when the first write operation W1 is performed in the first interval, the version information may not increase even though the second write operation W2 is performed.

In the first interval, a write operation W may be performed on a logical address LA of a map data block corresponding to the offset "11". The write operation W may accompany operations of writing data in the nonvolatile memory device 110 and updating all or part of the map data block corresponding to the offset "11" of the storage map cache data MCD_S. Version information of the offset "11" may increase when the map data block of the offset "11" is updated.

After the first interval ends, map data blocks of the storage map cache data MCD_S, for example, the updated map data blocks corresponding to the offsets "08" and "11" may be uploaded as the host map cache data MCD_H.

In a second interval, a write operation W may be performed on a logical address LA of a map data block corresponding to the offset "08". The write operation W may accompany operations of writing data in the nonvolatile memory device 110 and updating all or part of the map data block corresponding to the offset "08" of the storage map cache data MCD_S. Version information of the offset "08" may increase when the map data block of the offset "08" is updated.

In the second interval, a read operation R may be performed on a logical address LA of a map data block corresponding to the offset "11". Since the map data block corresponding to the offset "11" is uploaded as the host map cache data MCD_H after the first interval ends, the version information received from the host device is the same as version information of a map data block corresponding to the offset "11" of the storage map cache data MCD_S. Accordingly, the controller 120 may perform a read operation by using a physical address PA received from the host device.

In a third interval, a read operation R may be performed on a logical address LA of a map data block corresponding to the offset "08". After the write operation of the second interval is performed, the map data block corresponding to the offset "08" may not be uploaded as the host map cache data MCD_H. Accordingly, the version information received from the host device may be smaller than the version information of the map data block corresponding to the offset "08" of the storage map cache data MCD_S, not the same as that. Accordingly, the controller 120 may ignore a physical address PA received from the host device and may convert a logical address LA received from the host device into a physical address PA by using the map data block corresponding to the offset "08" of the storage map cache data MCD_S.

As described above, the controller 120 may not increase version information whenever a map data block of the storage map cache data MCD_S is updated, but it may increase version information of a map data block in which one or more update operations are performed during a specific time interval. Accordingly, it may be possible to use version information more efficiently and to reduce overhead of the controller 120 that manages the version information.

Figure 26:
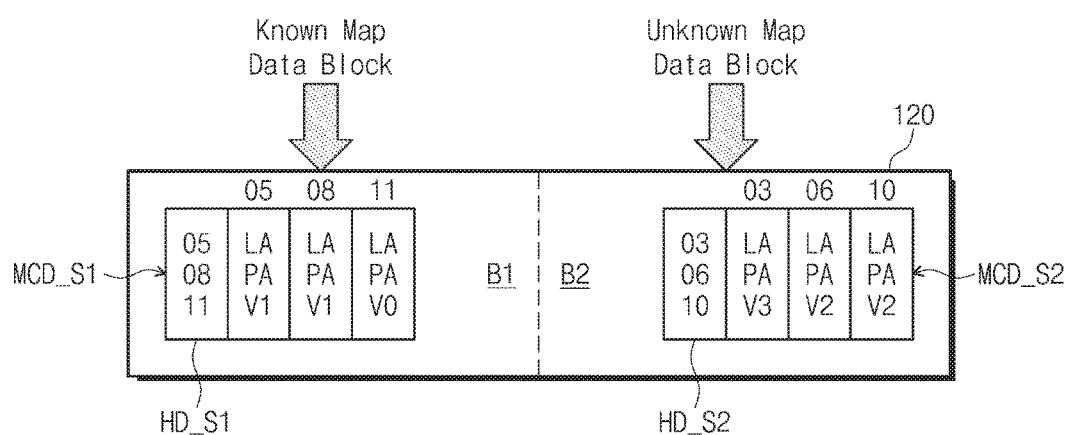
FIG. 26 shows an example in which the controller manages storage map cache data.

FIG. 26 shows an example in which the controller 120 manages the storage map cache data MCD_S. Referring to FIG. 26, the controller 120 may use an internal buffer space after dividing it into a first buffer B1 and a second buffer B2.

The controller 120 may store map data blocks, which are known to a host device, in the first buffer B1. For example, the controller 120 may store map data blocks loaded by a read operation and map data blocks, which are generated or updated but of which update or generation information is known to the host device, in the first buffer B1 as first map cache data MCD_S1.

The controller 120 may store map data blocks, which are not known to the host device, in the second buffer B2. For example, the controller 120 may store map data blocks, which are generated or updated during a write operation but of which generation or update information is not known to the host device through a response, in the second buffer B2 as second storage map cache data MCD_S2. As described with reference to FIG. 9, when the host device requests map data MD without designating a range, the controller 120 may first send map data blocks of the second storage map cache data MCD_S2 stored in the second buffer B2 to the host device. When the size of the second storage map cache data MCD_S2 reaches a preset or, alternatively, desired threshold value, as described with reference to FIG. 9, the controller 120 may inform the host device to request the map data MD. For example, the controller 120 may include a notification in each of various responses and may send the responses each including the notification to the host device. If map data blocks of the second storage map cache data MCD_S2 are applied to the host map cache data of the host device, since the map data blocks are known to the host device, the map data blocks may move to the first buffer B1.

It may be possible to send update information of map data blocks generated in the controller 120 to the host device more rapidly by separately managing map data blocks, which are not known to the host device, as the first storage map cache data MCD_S1 and assigning the priority to upload to the host device.

Figure 27:
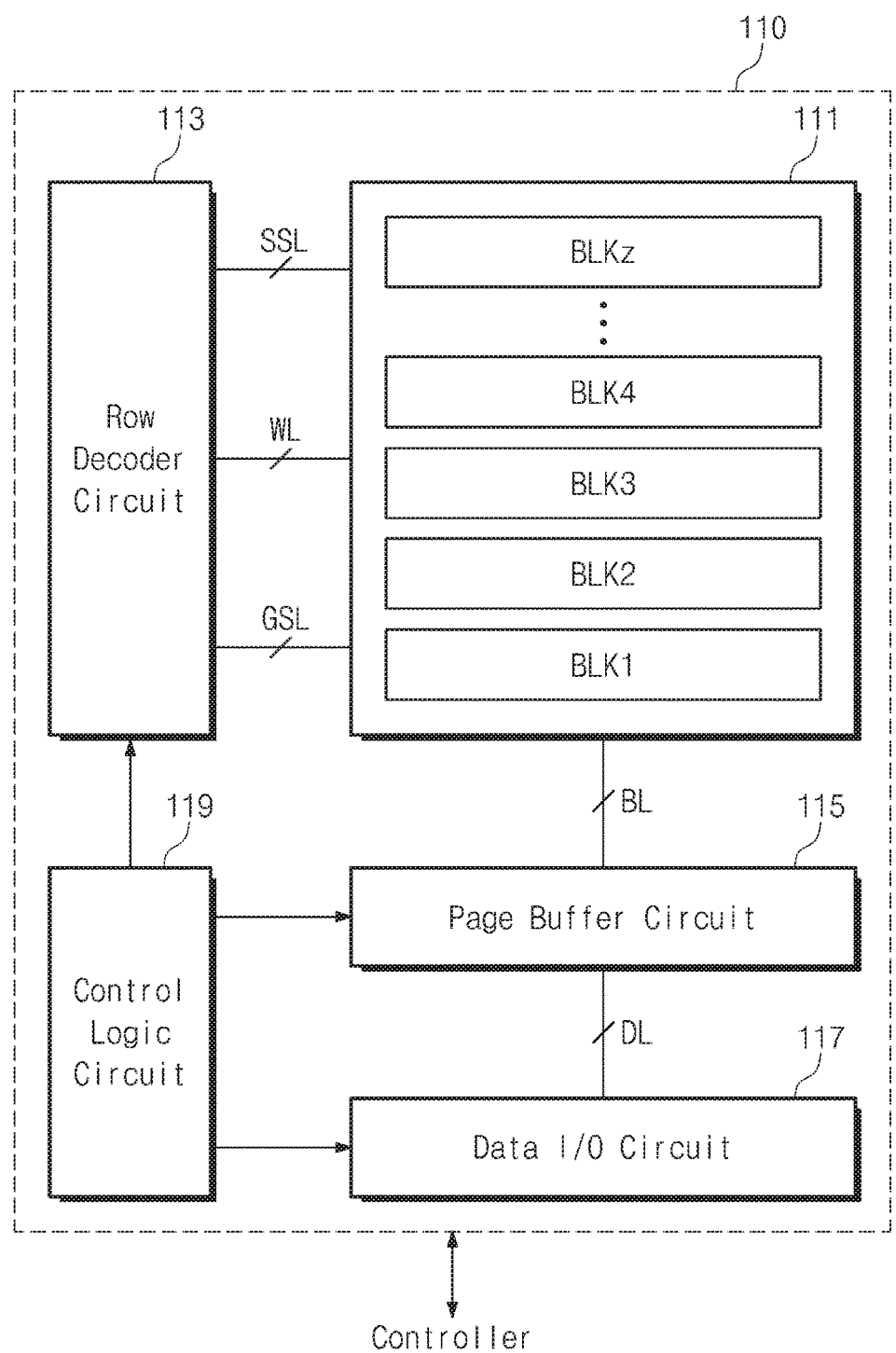
FIG. 27 is a block diagram illustrating a nonvolatile memory device according to at least some example embodiments of the inventive concepts.

FIG. 27 is a block diagram illustrating the nonvolatile memory 110 according to at least some example embodiments of the inventive concepts. Referring to FIGS. 1 and 27, a nonvolatile memory 110 may include a memory cell array 111, a row decoder circuit 113, a page buffer circuit 115, a data input/output (I/O) circuit 117, and a control logic circuit 119.

The memory cell array 111 may include a plurality of memory cells BLK1 to BLKz. Each of the memory blocks BLK1 to BLKz may include a plurality of memory cells. Each of the memory blocks BLK1 to BLKz may be connected to the row decoder circuit 113 through at least one string selection line SSL, a plurality of word lines WL, and at least one ground selection line GSL. Each of the memory blocks BLK1 to BLKz may be connected to the page buffer circuit 115 through a plurality of bit lines BL. The memory blocks BLK1 to BLKz may be connected in common to the bit lines BL. The memory cells in the memory blocks BLK1 to BLKz may have the same structures.

The row decoder circuit 113 may be connected to the memory cell array 111 through a plurality of ground selection lines GSL, the plurality of word lines WL, and a plurality of string selection lines SSL. The row decoder circuit 113 may operate according to control of the control logic circuit 119. The row decoder circuit 113 may decode an address received from the controller 120 through an I/O channel and perform voltage control with respect to the string selection lines SSL, the word lines WL, and the ground selection lines GSL based on the decoded address.

The page buffer circuit 115 may be connected to the memory cell array 111 through the bit lines BL. The page buffer circuit 115 may be connected to the data I/O circuit 117 through a plurality of data lines DL. The page buffer circuit 115 may operate under control of the control logic circuit 119.

The data I/O circuit 117 may be connected to the page buffer circuit 115 through the data lines DL. The data I/O circuit 117 may output data, which is read by the page buffer circuit 115, to the controller 120 through the I/O channel and provide data, which is received from the controller 120 through the I/O channel, to the page buffer circuit 115.

The control logic circuit 119 may receive a command from the controller 120 through the I/O channel and receive a control signal therefrom through a control channel. The control logic circuit 119 may receive a command, which is provided through the I/O channel, in response to the control signal, route an address, which is provided through the I/O channel, to the row decoder circuit 113, and route data, which is provided through the I/O channel, to the data I/O circuit 117. The control logic circuit 119 may decode the received command and control the nonvolatile memory device 110 based on the decoded command.

FIG. 28 is a circuit diagram illustrating a memory block BLKa according to at least some example embodiments of the inventive concepts. Referring to FIG. 28, the memory block BLKa may include a plurality of cell strings CS11 to CS21 and CS12 to CS22. The cell strings CS11 to CS21 and CS12 to CS22 may be arranged along a row direction and a column direction to constitute rows and columns.

For example, the cell strings CS11 and CS12 arranged along the row direction may constitute a first row, and the cell strings CS21 and CS22 arranged along the row direction may constitute a second row. The cell strings CS11 and CS21 arranged along the column direction may constitute a first column, and the cell strings CS12 and CS22 arranged along the column direction may constitute a second column.

Each cell string may include a plurality of cell transistors. The cell transistors include a ground selection transistor GST, memory cells MC1 to MC6, and string selection transistors SSTa and SSTb. The ground selection transistor GST, the memory cells MC1 to MC6, and the string selection transistors SSTa and SSTb in each cell string may be stacked in a height direction perpendicular to a plane (e.g., a plane on a substrate of the memory block BLKa) on which the cell strings CS11 to CS21 and CS12 to CS22 are arranged along the rows and the columns.

The cell transistors may be charge trap type cell transistors of which the threshold voltages vary according to the amount of charges trapped in an insulating layer thereof.

Sources of the lowermost ground selection transistors GST may be connected in common to a common source line CSL.

Control gates of ground selection transistors GST of the cell strings CS11 and CS12 in a first row are connected in common to a ground selection line GSL1, and control gates of ground selection transistors GST of the cell strings CS21 and CS22 in a second row are connected in common to a ground selection line GSL2. That is, cell strings in different rows are connected to different ground selection lines.

Control gates of memory cells that are placed at the same height (or order) from the substrate (or the ground selection transistors GST) are connected in common to a word line. Control gates of memory cells that are placed at different heights (or, orders) are connected to different word lines WL1 to WL6. For example, the memory cells MC1 is connected in common to a word line WL1. The memory cells MC2 is connected in common to a word line WL2. The memory cells MC3 is connected in common to a word line WL3. The memory cells MC4 is connected in common to a word line WL4. The memory cells MC5 is connected in common to a word line WL5. The memory cells MC6 is connected in common to a word line WL6.

That is, cell strings in different rows are connected to different string selection lines. String selection transistors of cell strings in the same row, which have the same height (or order), are connected to the same string selection line. String selection transistors of cell strings in the same row, which have different heights (or orders), are connected to different string selection lines.

Columns of the cell strings CS11 to CS21 and CS12 to CS22 are respectively connected to different bit lines BL1 and BL2. For example, the string selection transistors SSTb of the cell strings CS11 and CS21 in the first column are connected in common to the bit line BL1. The string selection transistors SSTb of the cell strings CS12 and CS22 are connected in common to the bit line BL2.

As described above, the memory block BLKa may be provided at a three-dimensional memory array. The 3D memory array is monolithically formed in one or more physical levels of arrays of memory cells MC having an active area disposed above a silicon substrate and a circuitry associated with the operation of those memory cells MC. The circuit associated with an operation of memory cells MC may be located above or within such substrate. The term "monolithic" means that layers of each level of the array are directly deposited on the layers of each underlying level of the 3D memory array.

According to at least one example embodiment of the inventive concepts, the 3D memory array includes vertical NAND strings (or cell strings) that are vertically oriented such that at least one memory cell is located over another memory cell. The at least one memory cell may comprise a charge trap layer. Each vertical NAND string may further include at least one selection transistor placed over the memory cells MC. The at least one selection transistor may have the same structure as the memory cells MC and may be formed uniformly with the memory cells MC.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

According to at least some example embodiments of the inventive concepts, map data of the storage device is sent to the host device. The host device may send a read request including a physical address to the storage device based on the map data. Since an operation of performing address translation with respect to the read request including the physical address or reading the map data from the nonvolatile memory device is not accompanied, the operating speeds of the storage device and the computing device including the storage device are improved.

Also, not the storage device but the host device has the authority to manage the map data sent to the host device. Accordingly, since there is no need to send the authority to manage a memory of the host device to the storage device, at least some example embodiments of the inventive concepts may be implemented by using an existing interface without modifying or changing an interface between the host device and the storage device. Accordingly, it may be reduced costs needed to implement at least some example embodiments of the inventive concepts.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An operating method of a storage device that includes a nonvolatile memory device and a controller configured to control the nonvolatile memory device, the method comprising:

sending map data from the storage device to a host device, the map data mapping one or more of a plurality of physical addresses of the nonvolatile memory device to one or more of a plurality of logical addresses of the host device;

receiving, at the storage device, a read request from the host device;

if the read request includes a physical address,
reading data from the nonvolatile memory device based on the included physical address; and if the read request does not include a physical address,
translating a logical address of the read request into a first physical address, and
reading data from the nonvolatile memory device based on the translated first physical address, wherein the sending comprises:
sending at least a portion of the map data from the controller to the host device after reading the at least a portion from the nonvolatile memory device, at power-on.

2. The method of claim 1, wherein the sending further comprises:
storing, by the controller, identifiers associated with blocks of the map data; and
sending the stored identifiers to the host device.

3. The method of claim 1, wherein the sending further comprises:
receiving, at the controller, a map data request from the host device;
collecting, by the controller, mapping information indicating a mapping between one or more of the plurality of logical addresses and one or more of the plurality of physical addresses; and
sending the collected information from the controller to the host device as the map data, if a size of the collected information reaches a reference size.

4. The method of claim 3, wherein when the mapping information is changed by additional or updated information, the controller collects the additional or updated information.

5. The method of claim 3, wherein the sending further comprises:
receiving again, at the controller, the map data request from the host device after the map data is sent to the host device.

6. The method of claim 3, further comprising:
writing, by the controller, the collected information in the nonvolatile memory device while the controller sends the collected information as the map data to the host device.

7. The method of claim 1, wherein the sending further comprises:
receiving, at the controller, a map data request from the host device;
collecting, by the controller, mapping information indicating a mapping between one or more of the plurality of logical addresses and one or more of the plurality of physical addresses; and
sending the collected information from the controller to the host device as the map data at regular intervals.

8. The method of claim 1, wherein the sending further comprises:
receiving, at the controller, a map data request from the host device;
collecting, by the controller, mapping information indicating a mapping between one or more of the plurality of logical addresses and one or more of the plurality of physical addresses; and
sending, from the controller, the collected information as the map data to the host device when no pending host requests remain in the storage device.

9. The method of claim 1, wherein the sending further comprises:
receiving, at the controller, a map data request and a logical address from the host device;
collecting, by the controller, information of a physical address mapped to the received logical address; and
sending the collected information from the controller to the host device as the map data.

10. The method of claim 1, further comprising:
receiving, at the controller, a write request and data from the host device;
writing, by the controller, the data in the nonvolatile memory device based on the write request; and
sending a write response from the controller to the host device, if the data is written in a range of consecutive physical addresses of the nonvolatile memory device, the write response including a start physical address of the range of consecutive physical addresses.

11. The method of claim 10, further comprising:
sending, from the controller, a write response, in which a physical address is not included, if the data is written in two or more ranges of consecutive physical addresses of the nonvolatile memory device;
receiving, at the controller, a map data request from the host device; and
sending, from the controller to the host device, start physical addresses of the two or more consecutive physical address ranges in response to the map data request.

12. The method of claim 1 wherein, the read request does include the included physical address, and the reading data from the nonvolatile memory device based on the included physical address comprises:
generating a signature based on the included physical address and a logical address of the read request; and
reading data from the nonvolatile memory device based on the included physical address, if a signature of the read request is the same as the generated signature.

13. The method of claim 12, further comprising:
if the signature of the read request is different from the generated signature, translating the logical address of the read request into a second physical address and reading data from the nonvolatile memory device based on the translated second physical address.

14. The method of claim 1, wherein the receiving comprises:
when data corresponding to the read request belongs to a range of consecutive physical addresses of the nonvolatile memory device,
receiving, at the controller from the host device, the read request including a start physical address of the consecutive physical address range; and
when data corresponding to the read request belongs to two or more ranges of consecutive physical addresses of the nonvolatile memory device,
receiving at the controller from the host device, the read request, in which a physical address is not included, and a second request including start physical addresses of the two or more consecutive physical address ranges.

15. The method of claim 1, wherein the sending further comprises:
generating, by the controller, signatures based on logical addresses and physical addresses of the map data; and sending, from the controller, the signatures to the host device together with the map data.

16. The method of claim 1,
wherein the sending further comprises:
    encrypting, by the controller, at least the one or more physical addresses among the map data; and
    sending from the controller to the host device, the map data,
    the map data mapping the encrypted one or more physical addresses to the one or more logical addresses,
wherein the read request does include the included physical address and the included physical address is an encrypted physical address, and
wherein the reading data from the nonvolatile memory device based on the included physical address comprises:
    decrypting, by the controller, the included physical address sent from the host device; and
    reading, by the controller, data from the nonvolatile memory device based on the decrypted physical address.

17. The method of claim 1, further comprising:
performing, by the controller, defragmentation such that data, which is stored in the nonvolatile memory device and corresponds to consecutive logical addresses among the plurality of logical addresses, corresponds to consecutive physical addresses among the plurality of physical addresses.

18. A storage device comprising:
a nonvolatile memory device; and
a controller to control the nonvolatile memory device,
    wherein the controller is configured to generate signatures based on logical addresses and physical addresses of map data and send map data together with the signatures to a host device, the map data mapping one or more of a plurality of physical addresses of the nonvolatile memory device to one or more of a plurality of logical addresses of the host device, and wherein the controller is configured such that,
    if a read request received from the host device includes a physical address associated with the map data, the controller reads data from the nonvolatile memory device based on the physical address, and
    if a read request received from the host device does not include a physical address, the controller translates a logical address of the read request into a physical address, and reads data from the nonvolatile memory device based on the translated physical address.

19. An operating method of a storage device that comprises a nonvolatile memory device and a controller configured to control the nonvolatile memory device, the method comprising:
    mapping, by the storage device, physical addresses of the nonvolatile memory device and logical addresses of a host device and sending map data including version information to the host device;
    receiving, by the storage device, a read request from the host device;
    based on whether the read request includes a first physical address and first version information and whether the first version information is the same as second version information stored in the controller, performing a read operation by using one of the first physical address and a second physical address that is obtained by converting a logical address of the read request; and
    increasing the second version information in response to mapping information corresponding to the second physical address being updated.

* * * * *